(12) United States Patent
Jacob et al.

(10) Patent No.: US 12,282,379 B2
(45) Date of Patent: *Apr. 22, 2025

(54) ERROR MONITORING AND PREVENTION IN COMPUTING SYSTEMS BASED ON FUTURE FAULT PREDICTION AND HISTORICAL VALUES OF A NETWORK CHARACTERISTIC

(71) Applicant: State Farm Mutual Automobile Insurance Company, Bloomington, IL (US)

(72) Inventors: Michael Shawn Jacob, LeRoy, IL (US); Benjamin D. Schappaugh, Bloomington, IL (US); William Guthrie, Mesa, AZ (US); Frank Matthew McCully, Hudson, IL (US); Timothy J. Nickel, Bloomington, IL (US); Brian W. Batronis, Gilbert, AZ (US); Robert D. Rariden, Bloomington, IL (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/528,220

(22) Filed: Dec. 4, 2023

(65) Prior Publication Data

US 2024/0103946 A1    Mar. 28, 2024

Related U.S. Application Data

(63) Continuation of application No. 17/501,231, filed on Oct. 14, 2021, now Pat. No. 11,836,032.

(Continued)

(51) Int. Cl.
*G06F 11/07* (2006.01)
*G06F 11/00* (2006.01)
*G06N 20/00* (2019.01)

(52) U.S. Cl.
CPC ........ *G06F 11/004* (2013.01); *G06F 11/0754* (2013.01); *G06N 20/00* (2019.01)

(58) Field of Classification Search
CPC . G06F 11/004; G06F 11/0754; G06F 11/0751
See application file for complete search history.

(56) References Cited

U.S. PATENT DOCUMENTS

| | | | |
|---|---|---|---|
| 6,212,649 B1 | 4/2001 | Yalowitz et al. | |
| 6,760,766 B1 * | 7/2004 | Sahlqvist | H04L 69/16 709/227 |

(Continued)

FOREIGN PATENT DOCUMENTS

WO    WO01/17169 A2    3/2001

OTHER PUBLICATIONS

Wikipedia's Latency (Engineering) historical version published Sep. 30, 2020 https://en.wikipedia.org/w/index.php?title=Latency_(engineering)&oldid=981154083 (Year: 2020).*

(Continued)

*Primary Examiner* — Joseph O Schell
(74) *Attorney, Agent, or Firm* — Lee & Hayes, P.C.

(57) ABSTRACT

Techniques for identifying faults in a collaborative computing system including a plurality of disparate, geographically separated computing systems are described herein. An intelligent monitoring (IM) server computing system may receive data from the plurality of computing devices and may monitor the health of the collaborative computing system. The IM server computing system may analyze the data and identify one or more faults associated with a portion of the collaborative system (e.g., an associated computing (Continued)

device, platform, network, etc.). In some examples, the IM server computing system may be configured to identify potential future faults associated with the portion of the collaborative system. Based on the fault, the IM server computing device may determine an action to take to remedy the fault and/or prevent the potential future fault. The IM server computing device may either automatically perform the action or send a notification to the associated computing system to perform the action.

22 Claims, 8 Drawing Sheets

Related U.S. Application Data

(60) Provisional application No. 63/092,119, filed on Oct. 15, 2020.

(56) References Cited

U.S. PATENT DOCUMENTS

| 7,055,173 | B1* | 5/2006 | Chaganty | H04L 45/22 |
| | | | | 726/13 |
| 7,856,575 | B2 | 12/2010 | Bock et al. | |
| 8,543,280 | B2 | 9/2013 | Ghimire et al. | |
| 9,401,991 | B2 | 7/2016 | Hamlin et al. | |
| 9,603,086 | B2* | 3/2017 | Lam | H04W 48/18 |
| 9,652,318 | B2 | 5/2017 | Namkoong et al. | |
| 10,108,480 | B2 | 10/2018 | Parra | |
| 10,121,157 | B2 | 11/2018 | Agarwal et al. | |
| 10,346,756 | B2 | 7/2019 | Kirk et al. | |
| 10,438,124 | B2 | 10/2019 | Kirk | |
| 10,621,003 | B2 | 4/2020 | Valecha | |
| 10,664,777 | B2 | 5/2020 | Volkov et al. | |
| 10,761,926 | B2 | 9/2020 | Chien | |
| 10,783,711 | B2 | 9/2020 | Sun et al. | |
| 10,872,160 | B2 | 12/2020 | AthuluruTirumala | |
| 10,891,571 | B2 | 1/2021 | Relangi | |
| 2004/0010733 | A1 | 1/2004 | S. et al. | |
| 2005/0193429 | A1* | 9/2005 | Demopoulos | H04L 63/0263 |
| | | | | 713/188 |
| 2007/0234224 | A1 | 10/2007 | Leavitt et al. | |
| 2014/0129285 | A1 | 5/2014 | Wu et al. | |
| 2014/0163907 | A1 | 6/2014 | Alley et al. | |
| 2014/0207506 | A1 | 7/2014 | Palmert et al. | |
| 2014/0222521 | A1 | 8/2014 | Chait | |
| 2014/0257835 | A1 | 9/2014 | Kashyap | |
| 2014/0278640 | A1 | 9/2014 | Galloway et al. | |
| 2015/0067892 | A1* | 3/2015 | Zuo | H04L 63/10 |
| | | | | 726/29 |
| 2015/0249512 | A1 | 9/2015 | Adimatyam et al. | |
| 2017/0132068 | A1* | 5/2017 | Parra | G06F 11/0793 |
| 2017/0344895 | A1 | 11/2017 | Roy | |
| 2018/0025084 | A1 | 1/2018 | Conlan et al. | |
| 2018/0032386 | A1 | 2/2018 | DeChiaro | |
| 2019/0114572 | A1 | 4/2019 | Gold et al. | |
| 2020/0084119 | A1 | 3/2020 | Zackariya et al. | |
| 2020/0128555 | A1 | 4/2020 | Kreiner et al. | |
| 2020/0167258 | A1* | 5/2020 | Chattopadhyay | G06F 9/5088 |
| 2020/0334123 | A1 | 10/2020 | Chatterjee et al. | |
| 2021/0042180 | A1 | 2/2021 | Sutton et al. | |
| 2021/0173756 | A1 | 6/2021 | Yoon et al. | |
| 2022/0036259 | A1 | 2/2022 | Bird | |
| 2022/0122183 | A1 | 4/2022 | Jacob et al. | |

OTHER PUBLICATIONS

Wikipedia's Machine Learning historical version published Oct. 12, 2020 https://en.wikipedia.org/w/index.php?title=Machine_learning&oldid=983136523 (Year: 2020).*

Office Action for U.S. Appl. No. 17/501,231, mailed on Feb. 2, 2023, Jacob, "Intelligent Error Monitoring and Alert", 15 Pages.

* cited by examiner

ERROR MONITORING AND PREVENTION IN COMPUTING SYSTEMS BASED ON FUTURE FAULT PREDICTION AND HISTORICAL VALUES OF A NETWORK CHARACTERISTIC

CROSS-REFERENCE TO RELATED APPLICATIONS

This U.S. Patent Application is a continuation of, and claims priority to, U.S. patent application Ser. No. 17/501,231 filed on Oct. 14, 2021, which claims priority to U.S. Provisional Patent Application No. 63/092,119, filed on Oct. 15, 2020, the entirety of which is incorporated herein by reference.

BACKGROUND

Collaboration across multiple disparate computing systems and platforms is becoming increasingly common in business. Often, a particular business will utilize services provided by external computing platforms, such as externally provided applications, as well as in-house computing platforms and/or applications, to conduct business, such as to provide a service to a customer. For example, a business may utilize local, company-owned assets, combined with a platform as a service (PaaS) or application platform as a service (aPaaS), to provide a service to a customer. By outsourcing at least a portion of the service provided to the customer, the particular business may more effectively and efficiently complete tasks for the customer. However, utilizing the external computing platforms and/or applications (e.g., third-party resource) increases complexity in the overall computing architecture (e.g., collaborative computing system) used to provide the service, thereby increasing the probability of encountering an error while providing the service to the customer. For example, one computing platform or network over which data is transmitted may experience a technical issue, thereby affecting the speed at which the business can provide the service to the customer.

Each computing platform, application, and/or network operating in the collaborative process may include a monitoring system to periodically and/or continually evaluate the health of the respective system and/or computing devices associated therewith. However, the individual monitoring systems may not communicate with one another to alert other computing systems of faults or potential future failures (e.g., high probability of a future system failure). As such, determining a root cause of a problem or fault associated with a collaborative computing system may be time and resource intensive. Furthermore, it may not be possible, with little or no insight into the individual monitoring systems associated with external computing platforms and/or applications, to identify a potential future failure associated with a third-party resource used in the collaborative computing system.

Examples of the present disclosure are directed toward overcoming the deficiencies noted above, as well as other deficiencies.

SUMMARY

This disclosure is directed to an intelligent error monitoring and alert system configured to identify faults and/or potential future faults in a collaborative computing system ("collaborative system"). The collaborative system may include a plurality of computing devices configured to communicate with one another via one or more networks. The plurality of computing devices may include computing devices that are managed by one or more disparate entities (e.g., businesses, companies, organizations, etc.) and/or located in geographically separated locations. For example, one or more first computing devices may be associated with a platform as a service and one or more second computing devices may be associated with an enterprise private cloud. In some examples, at least one computing device of the plurality of computing device may be separated from other computing devices of the collaborative system by a firewall.

The intelligent error monitoring and alert system may receive data from the plurality of computing devices and may monitor the health of the collaborative system. In some examples, the intelligent error monitoring and alert system may be configured to analyze the data and identify one or more faults associated with a portion of the collaborative system (e.g., an associated computing device, platform, network, etc.). In some examples, the intelligent error monitoring and alert system may be configured to identify potential future faults associated with the portion of the collaborative system. In some examples, the intelligent error monitoring and alert system may identify a computing system associated with the fault and/or potential future fault. In some examples, the intelligent error monitoring and alert system may send a notification of the fault and/or the potential future fault to the computing system associated therewith. In some examples, the intelligent error monitoring and alert system may determine an action to perform to remedy (e.g., resolve, etc.) the fault and/or prevent the potential future fault. In such examples, the intelligent error monitoring and alert system may cause the associated computing system to perform the action.

In various examples, a computing system may receive a plurality of data streams from a plurality of computing devices via one or more networks, wherein a first computing device of the plurality of computing devices is associated with a first organization and a second computing device of the plurality of computing devices is associated with a second organization that is different from the first organization. The computing system may determine a characteristic associated with a first data stream of the plurality of data streams. The computing system may determine, based at least in part on a set of rules, that a value associated with the characteristic meets or exceeds a threshold value. The computing system may identify a computing device associated with the first data stream. The computing system may determine, based on determining that the value exceeds the threshold value, a fault associated with the computing device. The computing system may identify an action to perform based at least in part on the fault and perform the action, wherein performing the action causes the fault associated with the computing device to be resolved.

In some examples, a method includes receiving, with a computing device of a computing system, a plurality of data streams from a plurality of computing devices via one or more networks, wherein a first computing device of the plurality of computing devices is associated with a first organization corresponding to the computing device and a second computing device of the plurality of computing devices is associated with a second organization that is different from the first organization. The method may further include determining that a value associated with a characteristic associated with a first data stream of the plurality of data streams meets or exceeds a threshold value. The method may further include determining, based on determining that the value meets or exceeds the threshold value, a fault associated with the first computing device associated with the first data stream. The method may further include identifying an action to perform based at least in part on the fault and performing the action, wherein performing the action includes causing the fault associated with the first computing device to be resolved.

In some examples, a non-transitory computer readable medium may be configured to receive a plurality of data streams from a plurality of computing devices via one or more networks, wherein a first computing device of the plurality of computing devices is associated with a first organization and a second computing device of the plurality of computing devices is associated with a second organization that is different from the first organization. The non-transitory computer readable medium may further be configured to determine, based at least in part on a rule, that a computing system associated with a first data stream of the plurality of data streams has associated therewith at least one of a fault or a potential future fault. The non-transitory computer readable medium may further be configured to identify an action to perform based at least in part on the at least one of the fault or the potential future fault and cause at least one computing device to perform the action, wherein performing the action includes causing the fault associated with the first computing device to be resolved.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1:
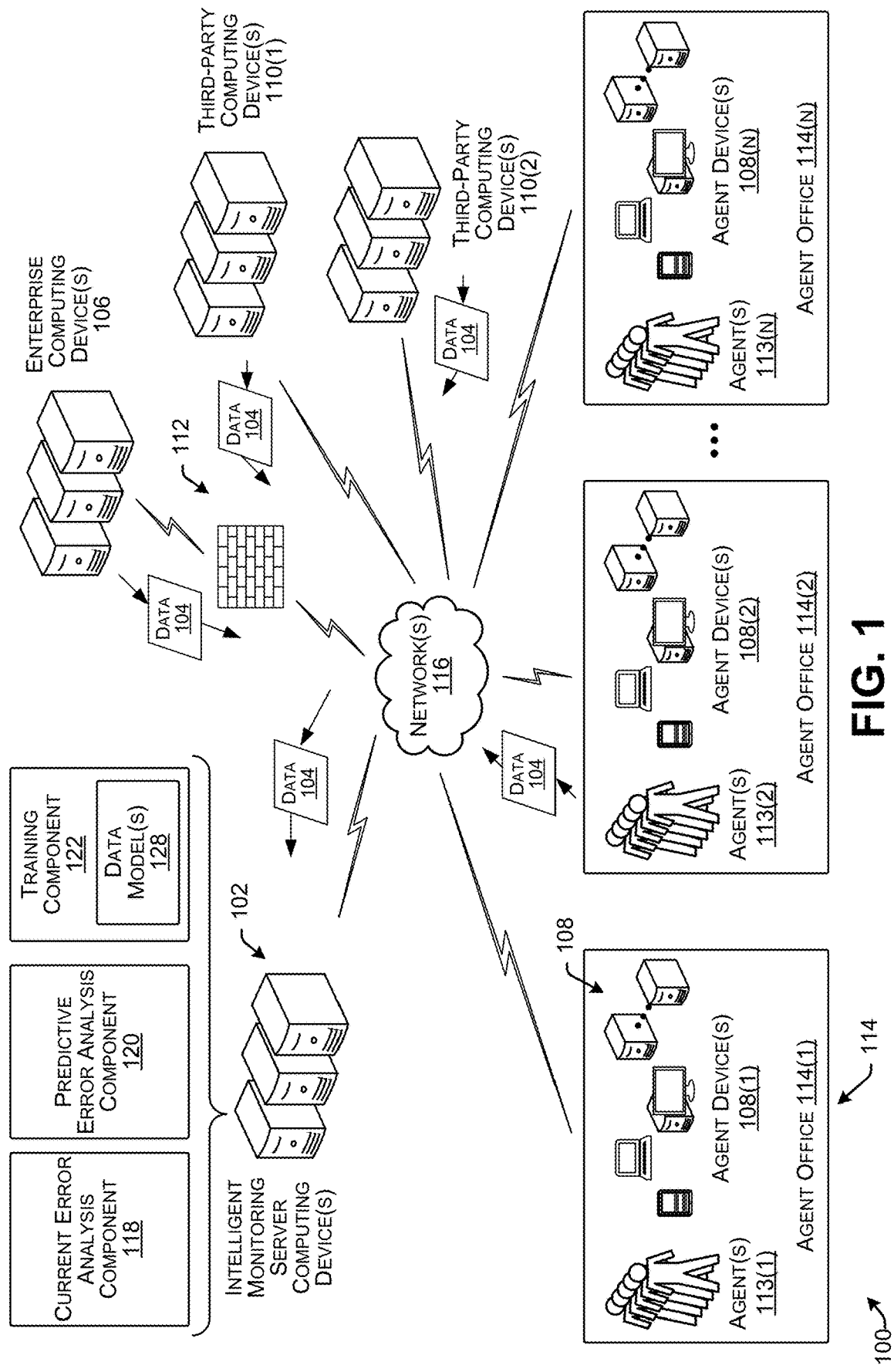
FIG. 1 illustrates an example collaborative computing system in which an intelligent error monitoring and alert system may be used to identify faults and/or potential future faults in the collaborative computing system.

FIG. 1 illustrates a collaborative computing system 100 (system 100) that includes one or more intelligent monitoring (IM) server computing device(s) 102 (e.g., IM computing device(s) 102) configured to receive data 104 from a plurality of disparate computing devices and monitor a health of a collaborative computing system based on the data 104, as described herein. In various examples, the collaborative computing system ("collaborative system") may include one or more computing resources associated with an organization of the IM server computing device(s) 102, such as one or more enterprise computing devices 106 and/or agent devices 108. In some examples, the collaborative system may include one or more computing resources associated with a different organization from the organization of the IM server computing device(s) 102, such as one or more third-party computing device(s) 110. The computing devices of the collaborative system (e.g., IM server computing device(s) 102, enterprise computing device(s) 106, agent device(s) 108, and/or third-party computing device(s) 110) may share data 104 in order to provide a service to a customer. For example, the collaborative system may be associated with an insurance provider, which operates to provide multiple services to customers. An agent operating an agent device may provide a service to a customer utilizing data provided by the enterprise computing device(s) 106, and/or third-party computing device(s). The IM server computing device(s) 102 may monitor the data 104 transmitted between computing devices to ensure the collaborative system operates smoothly (e.g., at an optimal speed, function, etc.).

The third-party computing device(s) 110 may include computing devices associated with a public cloud, a platform as a service, software as a service, infrastructure as a service, third-party applications (e.g., web-based and/or native applications managed by a third-party), and the like. The enterprise computing device(s) 106 may include computing devices associated with on-premise enterprise applications, an enterprise private cloud or other data centers, or the like. In some examples, data 104 transmitted between the enterprise computing device(s) 106 and the IM computing device(s) 102, and/or between the third-party computing device(s) 110 and the IM computing device(s) 102, may traverse a firewall 112. The firewall 112 may include hardware and/or software configured to filter data 104 transmitted to and from a computing device, such as enterprise computing device(s) 106. In various examples, the firewall 112 may have associated therewith one or more filter rules that govern the filtration of data 104 transmitted between the respective computing device and other computing devices via a network 116, such as data 104 transmitted between an enterprise computing device 106 and one or more agent devices 108.

The agent devices 108 may include computing devices associated with one or more agent offices 114. The agent office(s) 114 and/or the agent device(s) 108 may be geographically dispersed from one another. For example, a first agent office 114(1) may be physically located in Bloomington, Illinois, while a second agent office 114(2) may be physically located in Seattle, Washington. For another example, a first agent device 108(1) associated with a first agent office 114(1) may be located in New York City while a second agent device 108(2) associated with the first agent office 114(1) may be located in Rochester, New York. While discussed herein as being associated with a particular agent office 114, the agent devices 108 may include mobile devices, stationary devices, server devices, and/or any other type of computing device.

In at least one example, the enterprise computing device(s) 106 and the agent devices 108 may be associated with a single organization configured to provide insurance (e.g., automobile, life, property, small business etc.), banking (e.g., loans, savings, checking, etc.), and other services. In various examples, for an agent 113, such as agent 113(1), agent 113(2), or agent 113(N) associated with an agent office 114 to complete a task, such as to generate an insurance quote for a particular customer, the agent may have to utilize a plurality of applications on an associated agent device 108 and/or access a plurality of data stored on disparate, geographically separated computing devices (e.g., different agent devices, enterprise computing device(s) 106, third-party computing device(s) 110, etc.). The different applications may include custom built applications (e.g., by an organization associated with the IM computing device(s) 102), vendor provided applications, applications hosted (e.g., managed) by the organization associated with the IM computing device(s) 102, and/or applications hosted on a vendor computing device (e.g., third-party computing device(s) 110). The collaborative system may include two or more application created and/or hosted by two or more different organizations. For example, the agent 113 may access information associated with a first application of the plurality of applications that is managed by the enterprise computing device(s) 106, a second application that is managed by a first third-party computing device(s) 110(1), a third application that is managed by a second third-party computing device(s) 110(2), and so on. Due in part to the complexity of the collaborative system (e.g., including the plurality of computing devices, networks, firewalls, etc.), a slow down or failure of any device may cause the entire collaborative system to slow down or fail. The IM computing device(s) 102 may be configured to analyze data 104 received from the plurality of disparate computing devices (e.g., agent devices 108, the enterprise computing device(s) 106, the third-party computing device(s) 110) to determine one or more faults and/or potential future faults with the collaborative system.

In various examples, the agent devices 108, the enterprise computing device(s) 106, the third-party computing device(s) 110, and the IM computing device(s) 102 may be identified by one or more discrete identifiers (e.g., numbers, letters, symbols, etc.). In some examples, the identifiers may include organization identifiers (e.g., owner of the device, manager of the device, etc.), user identifier (e.g., identifier of a user associated with the device, agent identifier, etc.), internet-protocol addresses, role of the device (e.g., client device, server device, etc.), or the like. In some examples, a particular computing device may have associated therewith at least one discrete identifier by which the particular computing device may be identified, such as by the IM computing device(s) 102. For example, an agent computing device 108 may include a first identifier associated with the agent 113 corresponding thereto, a second identifier associated with the agent office 114 corresponding thereto, and a third identifier associated with an organization (e.g., a particular company) corresponding thereto.

In various examples, the agent device(s) 108, the enterprise computing device(s) 106, the third-party computing device(s) 110, and the IM computing device(s) 102 may include a variety of device types configured to communicate via network(s) 116 and are not limited to a particular type of device. In some examples, device types may include stationary devices, including but not limited to servers, desktop computers, personal computers, workstations, and thin clients, such as those capable of operating in the distributed computing resource. In at least one example, the one or more IM computing devices 102 may be configured to communicate with one another via a distributed computing resource. In some examples, the IM computing device(s) 102, the enterprise computing device(s) 106, the agent device(s) 108, and the third-party computing device(s) 110 may include mobile devices, including but not limited to mobile phones, tablet computers, laptop computers, and any other mobile computers or mobile telecommunication devices. In various examples, the IM computing device(s) 102, the enterprise computing device(s) 106, the agent device(s) 108, and the third-party computing device(s) 110 may include any other sort of computing device configured to communicate via the one or more networks 116.

In various examples, the network(s) 116 may include public networks such as the interne, private networks such as an institutional and/or personal network or some combination of public and private networks. The network(s) 116 may also include any type of wired and/or wireless network, including but not limited to local area networks (LAN), wide area networks (WAN), satellite networks, cable networks, Wi-Fi networks, WiMax networks, mobile communications networks (e.g., 3G, 4G, 5G, etc.), or any combination thereof. The network(s) 116 may utilize communications protocols, including packet-based and/or datagram-based protocols, such as internet protocol (IP), transmission control protocol (TCP), user datagram protocol (UDP), or other types of protocols. Moreover, the network(s) 116 may also include a number of devices that facilitate network communications and/or form a hardware basis for the networks, such as switches, routers, gateway access points, firewalls, base stations, repeaters, backbone devices, and the like.

In some examples, network(s) 116 may further include devices that can enable connection to a wireless network, such as a wireless access point (WAP). The examples which support connectivity through WAPs send and receive data over various electromagnetic frequencies (e.g., radio frequencies), including WAPs that support Institute of Electrical and Electronics Engineers (IEEE) 802.11 standards (e.g., 802.11g, 802.11n, and so forth) and other standards.

In various examples, the IM computing device(s) 102 may receive data 104 from the enterprise computing device(s) 106, the agent device(s) 108, and/or the third-party computing device(s) 110 via the network(s) 116. In various examples, the IM computing device(s) 102 may receive the data in packets of data. In such examples, the respective computing device (e.g., the enterprise computing devices 106, the agent devices 108, and/or the third-party computing devices 110) may store data for a period of time and send the stored data 104 as a packet of data. For example, a third-party computing device 110, such as third-party computing device 110(2) may be associated with a PaaS that provides information technology (IT) security services to an organization associated with the IM computing device(s) 102. The third-party computing device 110(2) may monitor a number of logins/logouts to the organization and data associated with each login/logout (e.g., IP address, user account, security verification, etc.). In some examples, the third-party computing device 110(2) may monitor a time associated with a session (e.g., time between login and logout). In some examples, the third-party computing device 110(2) may track activity of a user on an associated account during the session. The third-party computing device 110(2) may store each login attempt and/or session data (e.g., time associated with a session, activity, etc.) associated with various accounts corresponding to the organization as an event. The third-party computing device 110(2) may send a packet of logged events that occurred over a period of time (e.g., over an hour, two hours, 24 hours, etc.) as a portion of the data 104.

In some examples, the data 104 may include real-time data and/or near real-time data. In some examples, the IM computing device(s) 102 may be configured to receive the data 104 in a plurality of streams of data. In some examples, each computing resource, such as a particular enterprise computing device 106, may send the data 104 in a data stream to the IM computing device(s) 102. The data 104 associated with a particular data stream may be generated by the respective computing device (e.g., an enterprise computing device 106, an agent device 108, a third-party computing device 110, etc.). For example, the third-party computing device 110(2) associated with the PaaS configured to provide IT security services for the organization may send data 104 associated with real-time and/or near real-time login information associated with members of the organization to the IM computing device(s) 102. For another example, an agent device 108(2) associated with an agent office 114(2) may send a data 104 as a query to an enterprise computing device 106, such as to access information stored in association with the enterprise application and/or stored on a private cloud.

In some examples, the enterprise computing device(s) 106, the agent device(s) 108, and/or the third-party computing device(s) 110 may send the data 104 to the IM computing device(s) 102 periodically (e.g., every minute, hourly, daily, weekly, etc.). In such examples, the data 104 may include information processed (e.g., gathered, generated, stored, etc.) by the associated computing devices throughout the periodic interval. Continuing the example above in which the third-party computing device 110(2) provides IT security services, the third-party computing device 110(2) may provide a daily report of login events. The daily report may include relevant information about each login event (e.g., attempted logins, successful logins, etc.), such as an associated account, success or failure of the login event, a time associated with the login event, an internet protocol (IP) address associated with the login event, and the like.

In some examples, the data 104 may be sent intermittently, such as when an event occurs and/or when a user of an associated device inputs the data 104. Again, continuing the example above in which the third-party computing device 110(2) provides IT security services, the third-party computing device 110(2) may send data 104 associated with a login event subsequent to or concurrently with the login event. In such examples, the data 104 may include real-time or near real-time data. For another example, an agent 113(2) utilizing an agent device 108(2) may access an instance of an application managed by an enterprise computing device 106, such as computing device associated with an enterprise application. The IM computing device(s) 102 may receive the data 104 transmitted between the agent device 108(2) and the enterprise computing device 106.

The IM computing device(s) 102 may receive the data 104 from the enterprise computing device(s) 106, the agent device(s) 108, and/or the third-party computing device(s) 110. A current error analysis component 118 of the IM computing device 102 may analyze the data 104 to determine one or more faults with associated systems. In some examples, the current error analysis component 118 may determine a particular portion of the associated system that corresponds to the fault(s). For example, the collaborative system may include an on-premise enterprise application that is stored on an enterprise computing device(s) 106. The on-premise enterprise application and data associated therewith may be stored on a main frame, a web server, and/or a file server. The current error analysis component 118 may analyze the data 104 received from the enterprise computing device(s) 106 to determine that a fault exists with the on-premise enterprise application. The current error analysis component 118 may determine the component, such as the main frame, web server, and/or file server with which the fault is occurring.

The fault(s) may be associated with one of the enterprise computing device(s) 106, agent device(s) 108, third-party computing device(s) 110, a firewall 112 located between computing resources, a network 116 via which the data 104 is transmitted, or the like. In some examples, the fault(s) may include hardware failures, software errors, firewall errors, slow processing speed, lack of memory, power loss, lack of connectivity, network slow-downs, and/or any other computer or network-related issue that may delay or prevent the transmission of the data 104. For example, a fault may include increased network latency associated with a network 116 via which at least a portion of the data 104 (e.g., a data stream, a packet of data, etc.) is transmitted. For another example, a fault may include an application associated with a third-party computing device 110, such as third-party computing device 110(2), or associated with the enterprise computing device(s) 106, operating below a threshold speed (e.g., application response time above a threshold response time). For yet another example, a fault may include a software glitch or error associated with an instance of an application on an agent device 108, such as agent device 108(N).

In some examples, the current error analysis component 118 may determine that the fault exists based on one or more rules. In some examples, the rule(s) may correspond to one or more characteristics associated with the data 104 and/or an associated computing system. In such examples, the current error analysis component 118 may determine the characteristic(s), such as memory available, application behavior, application response, reported incidents (e.g., a number of login events, a number of login events over a period of time, etc.), latency, response time, alerts, logged and/or real-time events, workload utilization, and the like. In various examples, the current error analysis component 118 may determine whether a characteristic exceeds a threshold value. For example, the current error analysis component 118 may determine that a latency is greater than or equal to a maximum latency threshold. For another example, the current error analysis component 118 may determine that a memory available on an associated device is equal to or less than a minimum memory threshold. For yet another example, the current error analysis component 118 may determine that a number of logged and/or real-time events meets or exceeds a maximum number of events over a period of time. As an illustrative example, the number of logged and/or real-time events may correspond to a plurality of login events. The login events may be associated with a same or different accounts associated with an organization. Based on one or more rules, the current error analysis component 118 may determine whether the logged and/or real-time events or a portion thereof are associated with a hacker attempting to gain access to the plurality of accounts. For example, the rules may indicate a maximum number of failed login attempts, a maximum frequency of logins, or a time of day and geographic location associated with the login events that are of low probability. In some examples, the current error analysis component 118 may analyze information associated with the logged and/or real-time events to determine whether the logged and/or real-time events or the portion thereof are associated with a single IP address (e.g., indicating a bad actor) or multiple different IP addresses (e.g., indicating different people trying to access the different accounts).

In various examples, the current error analysis component 118 may access historical data related to currently received data (e.g., real-time or near real-time data, periodic data, etc.). The historical data may provide an indication of a demand on a particular system and/or group of computing systems of the collaborative system at a given time or during a time period. In some examples, the current error analysis component 118 may compare the currently received data to the historical data to determine one or more trends associated therewith e.g., by using time series analysis and/or statistical modeling techniques. In some examples, the trend(s) may be associated with a particular computing system (e.g., one or more related devices, network, etc.). The trend(s) may be used to predict a potential future fault with the particular computing system. For example, the current error analysis component 118 may determine that an agent device 108 is processing data at a slower and slower rate over time. In such an example, the current error analysis component 118 may determine that the negative data processing trend may exceed a threshold decrease in processing speed (e.g., based on a rule) in the future, resulting in a potential fault. As another example, an application running on the enterprise computing device(s) 106 or the third-party computing device(s) 110 may show trend(s) indicating increasing memory and/or processing power (e.g. CPU cycles) utilization over time. In this example, the current error analysis component 118 may determine that, in the future, the memory and/or processing power may decrease to a level that is lower than threshold level(s), resulting in a potential future fault. In response, the IM computing device(s) 102 may allocate additional memory and/or computing power (e.g. from a PaaS or Cloud service) to the enterprise computing device(s) 106, or a third-party computing device(s) 110 running the application in order to prevent the potential future fault from occurring. Additionally, the IM computing device(s) 102 may determine an action to perform by taking into account cost concerns, such as subscription levels for Cloud-based services e.g., by determining whether increases in resource allocation may add to costs. As an example, if unused storage capacity is available without additional cost, the IM computing device(s) 102 may take an action to allocate additional memory from a Cloud storage, whereas, if a higher cost subscription level is required to allocate additional memory, the action selected may be to delete inactive data instead.

In some examples, the trend(s) may be associated with a particular time (e.g., time of day, day of week, month, etc.). In some examples, the current error analysis component 118 may determine whether the trend(s) exceeds a particular threshold associated with a rule. Based on a determination that the trend(s) exceeds a particular threshold, the current error analysis component 118 may determine an action to take at the particular time. For example, the current error analysis component 118 may determine that a network latency is slowing at a rate of 10 kilobits per second per day. The current error analysis component 118 determines that the rate exceeds a threshold slowdown rate and determines to re-route the data. As another example, the current error analysis component 118 may determine an increase in the number of users, such as the agents 113, of a licensed application. Based on a determination of such a trend, the current error analysis component 118 may determine that the number of users would exceed the number of application licenses available to the organization of the IM computing device 102. In response, the IM computing device(s) 102 may send notifications to users who are not actively using the licensed application to sign off from the application.

In some examples, the current error analysis component 118 may determine whether the trend(s) continues for greater than a threshold period of time. Based on a determination that the trend(s) exceeds a particular time threshold (e.g., consistently slowing down daily for 10 days), the current error analysis component 118 determines to perform an action to take. Continuing with the previous example, if the number of users of a particular licensed application consistently reach the number of licenses available, the current error analysis component 118 may determine an action to increase the number of available licenses e.g., by notifying an administrator of the requirement for additional licenses. In some examples, the current error analysis component 118 may determine periodic patterns in the current and/or historical data e.g., that a particular network consistently (e.g., more than two days in a row) slows down between 8-11 am. Based on the determination of the slowdown at the particular time, the current error analysis component 118 may determine to perform an action to re-route the data 104 to a different network between 8-11 am daily.

In some examples, the IM computing device(s) 102 may include a predictive error analysis component 120 configured to determine one or more potential future faults associated with one or more of the enterprise computing device(s) 106, the agent device(s) 108, the third-party computing device(s) 110, a firewall 112 located between computing resources, a network 116 via which the data 104 is transmitted, or the like. The predictive error analysis component 120 may determine the potential future fault based on a current state of an associated system (e.g., computing device, network, firewall, etc.), trend(s) and/or consistency thereof, a known amount of processing power and/or memory that will be available and/or needed by an application at a future time, known outages or deadlines such as license renewal dates, or the like. The predictive error analysis component 120 may utilize the trend(s) described above with reference to the current error analysis component 118. The predictive error analysis component 120 may also use machine learning methods trained on the data 104 collected during the operation of the collaborative computing system 100, historical fault and error reports, and corresponding remedial or preventative actions. For example, the predictive error analysis component 120 may determine that a current amount of memory available in an agent device 108(N) is equal to or less than a threshold amount that will likely be used over a future period of time (e.g., over the next two weeks, month, etc.). The predictive error analysis component 120 may determine that the agent device 108(N) has associated therewith a potential future fault associated with the memory. For another example, the predictive error analysis component 120 may determine that a latency of a particular network 116 over which a portion of the data 104 travels has consistently increased over time. The predictive error analysis component 120 may determine that a length of time and/or rate of the slowing trend is likely to result in a network latency at a time in the future that is above a latency threshold. As such, the predictive error analysis component 120 may identify a potential future fault associated with the network 116.

In some examples, the predictive error analysis component 120 may determine that the potential future fault exists based on the one or more rules. In some examples, the predictive error analysis component 120 may determine the characteristic(s) associated with the data 104 and may determine the potential future fault based on the rule(s). For example, the predictive error analysis component 120 may determine that a number of logged and/or real-time events meets or exceeds a maximum rate of events (e.g., 10 events per min, 1 event per second, etc.) over a period of time. Based on the determination that the maximum rate of events is met or exceeded, the predictive error analysis component 120 may determine that at a time in the future, a portion of the collaborative system will not be able to process the events and that a potential future fault may occur.

In various examples, the predictive error analysis component 120 may determine that the potential future fault may occur based on historical performance data. In such examples, the predictive error analysis component 120 may access historical data associated with the disparate computing devices 106, 108, 110 of the collaborative computing system 100 to determine whether the potential future fault may occur. In some examples, the likelihood of potential future fault may be determined based on a time (e.g., number of days in a row) associated with a particular trend, an amount of change in the system day by day (e.g., daily performance change), a consistency in performance (e.g., constant decreasing performance, periodic increase/decrease, etc.), and the like.

In various examples, the IM computing device(s) 102 may determine one or more actions to take based on the fault and/or the potential future fault. The action(s) may include network routing modifications, infrastructure modifications and/or optimization (e.g., adding resources, deleting resources, etc.), resource adaptation and optimization (e.g., modifying an application, modifying an application programming interface, etc.), computing system preventative health assessments, capacity planning (e.g., memory, adoption rates, load balancing etc.), and/or other actions designed to remedy faults and/or prevent potential future faults, as discussed in the examples above.

In some examples, the action(s) may include sending a notification to an associated computing device to alert a system manager of the fault and/or the potential future fault. In some examples, the notification may include a push notification, electronic mail, short message system message, or other notification system configured to alert a person of the fault and/or potential future fault. For example, the IM computing device(s) 102 may determine that an external application (e.g., not associated with an organization of the IM computing device(s) 102) managed by a third-party computing device 110, such as third-party computing device 110(2), has associated therewith an application error. The IM computing device(s) 102 may send a notification alerting a third-party resource of the application error.

In some examples, the notification may include an instruction for the associated computing device to perform an action to remedy the fault and/or prevent the potential future fault. In such examples, the IM computing device(s) 102 may cause the associated computing system to remedy the fault and/or prevent the potential future fault. Continuing the example from above, the predictive error analysis component 120 may determine that a current amount of memory available in an agent device 108(N) is equal to or less than a threshold amount that will likely be used over a future period of time. The IM computing device(s) 102 may thus send a notification to the agent device 108(N) and/or another computing device associated with the agent office 114(N), with an instruction to remove data stored on the agent device 108(N). In some examples, responsive to receiving the notification with the associated instruction, the agent device 108(N) and/or the other computing device associated with the agent office 114(N) may automatically (e.g., without user input) remove unused data and/or allocate additional resources to the agent device 108(N). For example, based on a determination that the agent device is running out of memory (e.g., has less than a threshold amount of available memory), the IM computing device(s) 102 may allocate additional memory to an enterprise computing device(s) 106, or a third-party computing device(s) 110 associated with a PaaS or Cloud application in order to overcome or mask errors, outages, or negative user experiences associated with an application and/or generate an alert that the agent device 108(N) needs to be upgraded to a computing device with additional memory. Additionally or alternatively, based on a determination that the agent device is running out of memory, the IM computing device(s) 102 may cause an optimization (e.g., clean up) procedure to be performed on the agent device to free up wasted memory to make it available for application utilization. For another example, based on a determination that the agent device 108(N) is running out of memory, the IM computing device(s) 102 may modify a configuration of an application (e.g., at a later time when the application is not running) to make the application less memory intense, such as to modify an instruction for a client device to store all data associated with the application. For yet another example, the IM computing device(s) 102 may determine that a network latency associated with a first network 116 is above a latency threshold, and thus has an associated fault. The IM computing device(s) 102 may send an instruction to a computing device sending data 104 via the first network 116 to send the data 104 via a second network 116.

In some examples, the IM computing device(s) 102 may automatically perform the action to remedy the fault and/or prevent the potential future fault. In some examples, the IM computing device(s) 102 may be configured to perform the action on computing devices associated with the same organization as the IM computing device(s) 102. In such examples, the IM computing device(s) 102 may be configured to re-allocate resources on computing devices associated with the organization (of which the IM computing device(s) 102 is associated), modify a firewall 112 associated with the organization, re-route data 104 based on network latency, and/or perform other actions to remedy faults and/or prevent potential future faults. As discussed above, the IM computing device(s) 102, the enterprise computing device(s) 106, and/or the agent device(s) 108 may be associated with a same organization. For example, the IM computing device(s) 102 may determine that a potential future fault is associated with the software on the agent device(s) 108(2) associated with the agent office 114(2). The action may include performing a software update on the agent device(s) 108. The IM computing device(s) 102 may automatically update the software on the agent device(s) 108(2) responsive to determining the potential future fault and/or the action.

In various examples, the IM computing device(s) 102 may include a training component 122 configured to determine the fault, the potential future fault, and/or the action(s) associated therewith. In some examples, the IM computing device(s) 102 may utilize machine learning techniques to train one or more data models 124 to identify the fault, the potential future fault, and/or the action(s). In such examples, the training module 122 may access fault data and/or actions stored in a database associated with the IM computing device(s) 102 and may process the data to train the data model(s) 124 to identify the fault, the potential future fault, and or the action(s). As will be discussed in further detail below with regard to FIGS. 7 and 8, in such examples, the training component 122 may utilize machine learning techniques to train the data model(s) 124. Additionally, or in the alternative, the data model(s) 124 may utilize one or more statistical models for processing data and determining an outcome (e.g., a fault, a potential future fault, an action, etc.).

Figure 2:
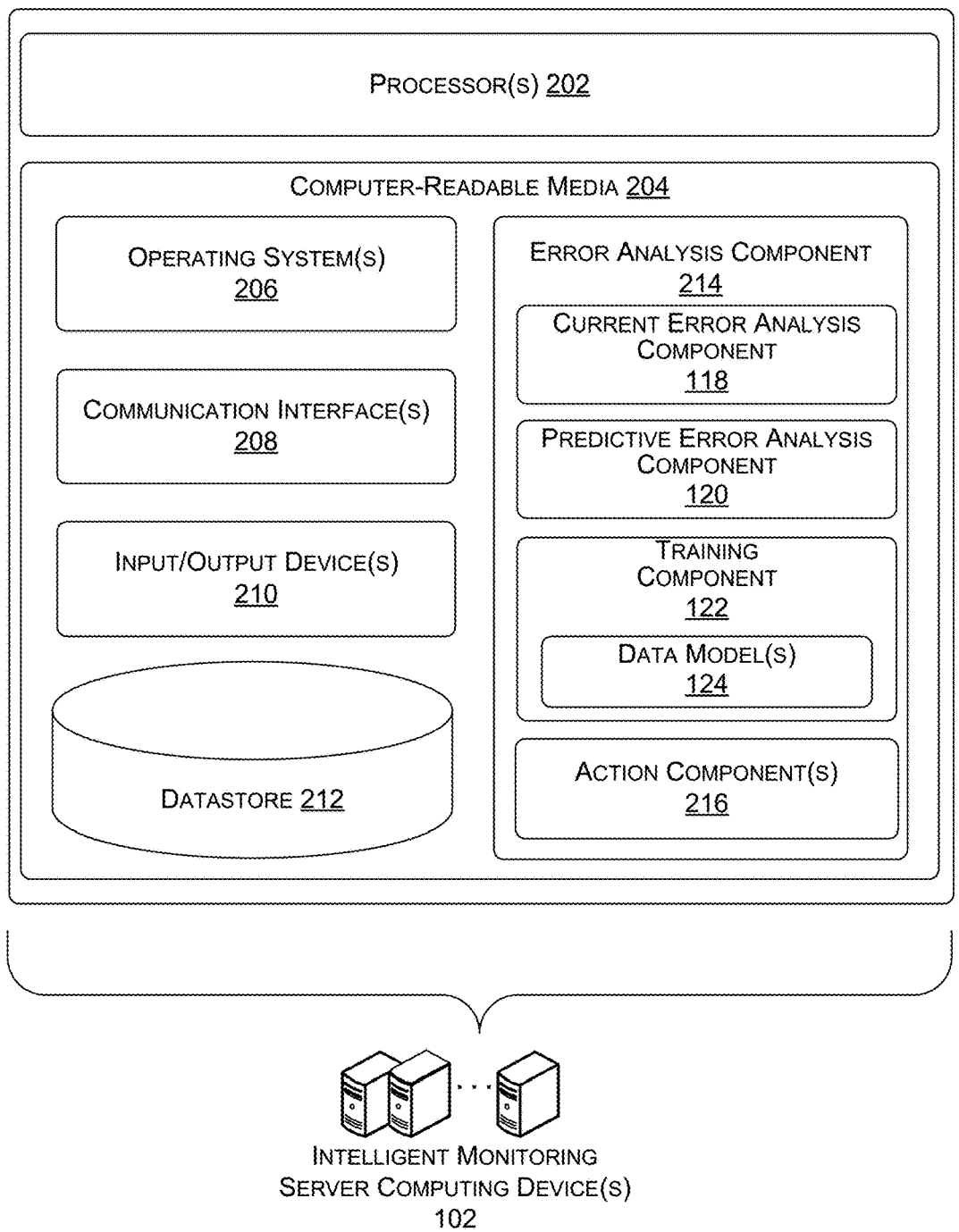
FIG. 2 illustrates an example intelligent monitoring server computing device for identifying faults and/or potential future faults in a collaborative computing system.

FIG. 2 is a block diagram of an illustrative computing architecture 200 of the IM computing device(s) 102. The computing architecture 200 may each be implemented in a distributed or non-distributed computing environment.

The computing architecture 200 may include one or more processors 202 and one or more computer-readable media 204 that stores various components, applications, programs, or other data. The computer-readable media 204 may include instructions that, when executed by the one or more processors 202, cause the processors to perform the operations described herein for the system 100.

The computer-readable media 204 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media appropriate for storing electronic instructions. In addition, in some examples the computer-readable media 204 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

As shown in FIG. 2, in some configurations, the computer-readable media 204 may store an operating system 206, one or more communication interface(s) 208, one or more input/output (I/O) interface(s) 210, and a datastore 212, which are described in turn. The components may be stored together or in a distributed arrangement. The operating system 206 may enable control and management of various functions of the IM computing device(s) 102, as described herein.

The communication interface(s) 208 may include one or more interfaces and hardware components for enabling communication with various other devices, such as over the network(s) 116 or directly. For example, communication interface(s) 208 may enable communication through the network(s) 116, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, the network(s) 116 may include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The computing architecture 200 may further include the one or more I/O devices 210. The I/O device(s) 210 may include speakers, a microphone, a camera, and various user controls (e.g., buttons, a joystick, a keyboard, a keypad, etc.), a haptic output device, and so forth. In some examples, the I/O device(s) 210 may enable a user to input data and/or instructions to run automation systems associated with intelligent error monitoring and alert. For example, an IM system manager may input a login alias and password associated with a third-party service provider associated with a third-party computing device, such as third-party computing device 110, to receive data associated with the third-party computing devices. The IM system manager may additionally input an instruction to run automation, such as to automatically perform actions to remedy faults and/or prevent potential future faults detected by the IM computing device(s) 102.

As illustrated in FIG. 2, the computing architecture 200 may include an error analysis component 214. The error analysis component 214 may be configured to identify faults and/or potential future faults and determine an action to perform to remedy a fault and/or prevent a potential future fault. The fault(s) may be associated with one or more enterprise computing devices (e.g., enterprise computing devices 106), agent devices (e.g., agent devices 108), third-party computing devices (e.g., third-party computing device(s) 110, firewalls (e.g., firewall 112) located between computing resources, networks (e.g., network(s) 116) via which data is transmitted to the computing architecture 200, or the like. In some examples, the fault(s) may include hardware failures, software errors, firewall errors, slow processing speed, lack of memory, power loss, lack of connectivity, network slow-downs, and/or any other computer or network-related issue that may delay or prevent the transmission of the data.

The error analysis component 214 may include a current error analysis component 118 configured to identify a current fault associated with the collaborative system. In some examples, the current fault may include a fault that is currently occurring, such as in real-time or near real-time. For example, the current error analysis component 118 may determine that an application associated with an application as a service provided by a third-party service provider (e.g., third-party resource via one or more third party computing devices) is currently experiencing an error and is not processing data. The current error analysis component 118 may determine that the current fault (e.g., error) is on-going and may identify it as a current fault.

In various examples, current error analysis component 118 may identify the current fault associated with the collaborative system based on one or more rules. In some examples, the rule(s) may correspond to one or more characteristics associated with transmitted data and/or an associated computing system. In such examples, the current error analysis component 118 may determine the characteristic(s), such as memory available, application behavior, application response, reported incidents, latency, response time, alerts, logged and/or real-time events, workload utilization, and the like. In various examples, the current error analysis component 118 may determine whether a characteristic exceeds a threshold value. For example, the current error analysis component 118 may determine that a network latency associated with a network via which the computing architecture 200 receives data has climbed above a latency threshold. Based on the network latency climbing above the latency threshold, the current error analysis component 118 may determine that a current fault is associated with the network. For another example, the current error analysis component 118 may determine that a latency of a computing device is greater than or equal to a maximum latency threshold. Based on the determination that the latency is greater than or equal to the maximum latency threshold, the current error analysis component 118 may identify a fault with the computing device.

In some examples, the computing architecture may include a predictive error analysis component 120 configured to determine one or more potential future faults associated with one or more of the enterprise computing device(s), the agent device(s), the third-party computing device(s), the firewall(s), the network(s), or the like. The predictive error analysis component 120 may determine the potential future fault based on the one or more rules. In some examples, the potential future fault may be determined based on a current state of an associated system (e.g., computing device, network, firewall, etc.), a trend and/or consistency thereof (e.g., using an increasing amount of processing power for a particular action, using a same amount of processing power for the particular action, etc.), a known amount of processing power and/or memory that will be available at a future time, or the like. For example, the predictive error analysis component 120 may determine that a software license associated with a particular agent device 108 will need to be updated in two weeks from a current date. The predictive error analysis component 120 may determine that the potential future fault includes the software becoming out of date in two weeks.

As illustrated in FIG. 2, the error analysis component 214 may include a training component 122. In some examples, the training component 122 may train one or more data models 124 to identify one or more faults associated with the collaborative system. In such examples, the data model(s) 124 may be trained to identify faults based on training data including previous faults associated with respective computing devices associated with the collaborative system. In some examples, the training data may be provided by the respective computing devices, such as by third-party resource error monitoring devices. For example, a third-party computing device may be associated with a PaaS. The PaaS may include an associated fault detection system. In some examples, the fault detection system may provide training data to the training component 122.

In some examples, the training component 122 may train the data model(s) 124 to identify one or more potential future faults associated with the collaborative system. In such examples, the data model(s) 124 may be trained to identify the potential future faults based on training data including previous faults and/or historical data that led up to the previous faults (e.g., trends, etc.). In various examples, the training component 122 may train the data model(s) 124 to determine one or more actions to perform to remedy a fault and/or prevent a potential future fault. In such examples, the training component 122 may train the data model(s) 124 utilizing training data including previous faults and actions used to remedy the previous faults, and/or potential future faults and preventative actions taken to prevent the potential fault from occurring.

In various examples, the computing architecture 200 may include one or more action components 216. The action component(s) 216 may be configured to determine one or more actions to perform to remedy a fault and/or prevent a potential future fault in the collaborative system. In some examples, the action component 216 may identify one or more computing devices associated with the fault and/or the potential future fault. In some examples, the action component(s) 216 may determine the action based on the computing device(s), such as based on a type of device, an owner of the device, a function performed by the device within the collaborative system, or the like.

The actions may include network routing modifications, infrastructure modifications, infrastructure optimization, resource adaptation and optimization, computing system preventative health assessments, capacity planning (e.g., memory, adoption rates, etc.), and/or other actions designed to remedy faults and/or prevent potential future faults. In some examples, the action(s) may include sending a notification to the associated computing device to alert a person (e.g., computing system manager) of the fault and/or the potential future fault. In some examples, the action component 216 may cause the notification to be presented on a display of the identified computing device associated with the fault and/or the potential future fault. In some examples, the action may include sending a notification with an instruction to perform an action to remedy the fault and/or to prevent the potential future fault. In some examples, the action(s) may be determined by the data model(s) 224. In such examples, the data model(s) 224 may be trained to determine the action(s) based on the detected fault, potential future fault, and/or the data.

In various examples, the action component 216 may be configured to automatically perform the action responsive to identifying the fault and/or the potential future fault and/or determining the action. In such examples, the action component 216 may not require human input prior to performing the action(s). The automatic fault detection and remedy provided by the action component 216 may greatly improve existing collaborative system error analysis by automatically causing an action to be performed based on detection of the detected fault and/or potential future fault. For example, the action component 216 may detect an increasing network latency associated with a network and may determine to re-route data to a different network. The action component 216 may automatically cause the data to be re-routed based on the determined action (e.g., re-route data). For another example, the action component 216 may detect an error associated with a third-party computing device corresponding to an infrastructure as a service. The action component 216 may automatically send a notification to the third-party computing device and/or another computing device associated with the infrastructure as a service to notify the third-party about the error. In some examples, the notification may include an instruction to fix the error. In such examples, the action component 216 may cause the third-party computing device to remedy the error based on the notification.

In various examples, the error analysis component 214 may store data, detected faults, potential future faults, and/or actions to remedy and/or mitigate the faults and/or prevent the potential future faults in the datastore 212. In some examples, the error analysis component 214 may be configured to determine a result of an action (e.g., a success and/or failure of an action to remedy a fault or to mitigate a potential future fault). In some examples, the error analysis component 214 may receive additional data at a later time (e.g., after the action is taken) and may determine whether the fault and/or potential future fault still exists. In some examples, the error analysis component 214 may receive the result of the action from an associated computing device, such as in a message indicating the fault and/or potential future fault has been remedied. In some examples, the message may include one or more actions taken to remedy the fault and/or prevent the potential future fault. In some examples, the error analysis component 214 may store the results in the datastore 212. In some examples, the results may be used, by the training component 122, as training data to train the one or more data models 124.

Figure 3:
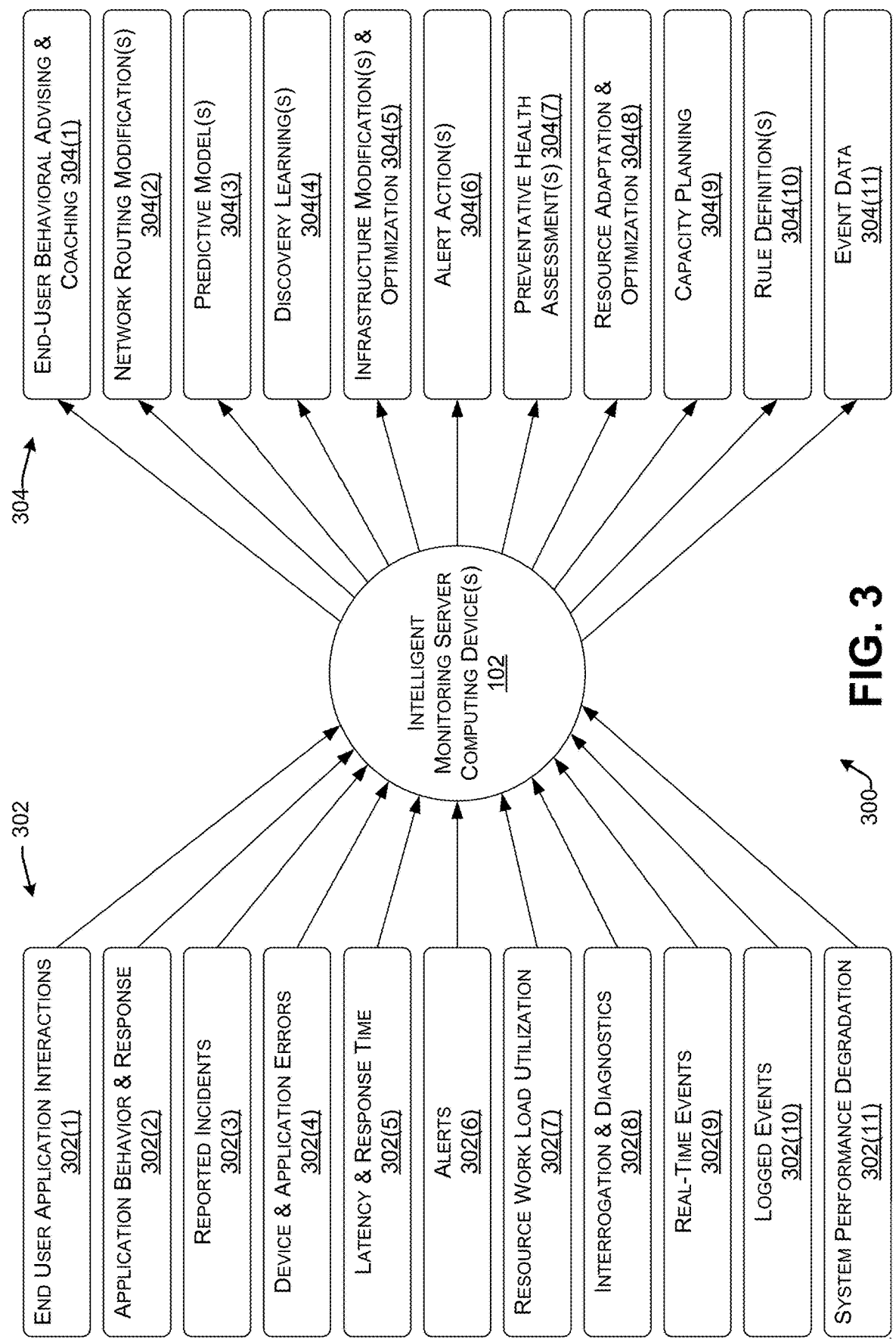
FIG. 3 illustrates example inputs and outputs of an intelligent monitoring server computing system.

FIG. 3 illustrates example data flow 300 associated with an intelligent monitoring and alert system of a collaborative computing system. The data flow 300 includes data 302, such as data 104, that is input into one or more intelligent monitoring server computing device(s) 102 (IM computing device(s) 102) of the intelligent monitoring and alert system. The IM computing device(s) 102 may process the data and generate one or more outputs 304 based on the data. The IM computing device(s) 102 may send the output(s) 304 to one or more computing devices of the collaborative computing system.

In various examples, the data 302 may include one or more end user application interactions 302(1). In various examples, the end user application interaction(s) 302(1) may include user interactions via an application user interface on a computing device. In at least one example, the computing device may include an agent device, such as agent device(s) 108. In various examples, the user interactions may include selections, inputs, navigation history, login history, and/or any other interaction with an application via the user interface.

In various examples, the IM computing device(s) 102 may store the end user application interactions 302(1) in a datastore, such as datastore 212. In various examples, the IM computing device(s) 102 may be configured to analyze the end user application interactions 302(1) to provide one or more outputs 304, such as end user behavioral advising and coaching 304(1). In some examples, the IM computing device(s) 102 may determine, based on the end user application interactions 302(1), that the end user may increase efficiency of application use by interacting with the application in a modified manner (e.g., selecting an alternative tab, inputting different information, modifying a manner of information input, etc.). In such examples, the IM computing device(s) 102 may provide information regarding the modified manner of interaction in the form of the end user behavioral advising and coaching 304(1).

In various examples, the end user behavioral advising and coaching 304(1) may increase an efficiency of application usage by the user by advising the user of more efficient means of application interaction. In such examples, the IM computing device(s) 102 may improve the functioning of the user computing device (e.g., agent device) by decreasing an amount of processing power and/or memory required to achieve an end result (e.g., process data, receive search results, etc.). For example, an agent may input a search query into an application of an agent device in order to access member data associated with a member name. However, the agent may not remember an exact spelling of the member name. The agent may input a closest guess and may submit the search query to a computing device that stores member data, such as an enterprise computing device 106. The agent device and the computing device may send data back and forth (e.g., updated queries with different spellings and responses) of the member name to identify the correct member and access the member data stored in the computing device. The IM computing device(s) 102 may receive each of the end user application interactions 302(1) and each of the responses (e.g., application behavior and response 302(2)) from the computing device as input 302. The IM computing device(s) 102 may identify a more efficient means of searching for member data without an accurate spelling, such as a wild card search. The IM computing device(s) 102 may provide information associated with the more efficient means of searching (e.g., instructions for performing the efficient search) to the agent as the end user behavioral advising and coaching 304(1).

In various examples, the IM computing device(s) 102 may receive application behavior and response 302(2) from one or more computing devices of the collaborative computing system, such as applications running on the enterprise computing device(s), the agent device(s), and/or third-party computing device(s). In various examples, the application behavior and response 302(2) may include a current state of an application on an associated device, a speed associated with application behaviors and/or responses (e.g., responses to queries, inputs, interactions, etc.), an amount of memory and/or processing power used by the application, and/or any other behaviors and/or responses of an application.

In various examples, the IM computing device(s) 102 may receive reported incidents 302(3). In some examples, the reported incidents 302(3) may include incidents detected by a monitoring system associated with a remote computing device, such as a third-party computing device or other computing device remote from the IM computing device(s) 102. In such examples, the reported incidents 302(3) may include incident data, such as a date, time, computing device, IP address, login data, member data, and/or any other information associated with the reported incident 302(3).

In various examples, the IM computing device(s) 102 may receive device and application errors 302(4). The device and application errors 302(4) may include errors detected and/or reported by the associated device and/or application running thereon. In some examples, the associated device may send the device and application errors 302(4) responsive to determining the error.

In various examples, the IM computing device(s) 102 may receive latency and response times 302(5). In some examples, the IM computing device(s) 102 may determine the latency and response times 302(5) based on other inputs 302, such as based on end user application interactions 302(1). In various examples, the latency and response times 302(5) may include speeds associated with a network and/or a computing device associated with the collaborative system.

In various examples, the IM computing device(s) 102 may receive one or more alerts 302(6). In some examples, the alert(s) 302(6) may include alerts from a remote monitoring system corresponding to a particular computing system (e.g., one or more third-party computing devices). In some examples, the alert(s) 302(6) may include inputs from a user of a particular device indicating an issue (e.g., degraded performance, etc.) with the particular device and/or an application running thereon.

In various examples, the IM computing device(s) 102 may receive resource workload utilization 302(7). In some examples, the resource workload utilization 302(7) may include usage associated with a central processing unit, graphics processing unit, graphics processing unit engine, memory, disk, network, or the like. In some examples, the resource workload utilization 302(7) may include a power usage and/or a power usage trend corresponding to an associated computing device.

In various examples, the resource workload utilization 302(7) may include performance data corresponding to an associated computing device. In some examples, the performance data may include data associated with a central processing unit, such as a utilization, a speed, one or more processes, one or more threads, one or more handles, up time, or the like. In some examples, the performance data may include data associated with a memory of an associated device, such as a total amount of memory that is in use, a memory available, committed memory, cached memory, paged pool memory, non-paged pool memory, and the like. In some examples, the performance data may include data associated with a disk of a corresponding computing device, such as active time, average response time, read speed, write speed, or the like. In some examples, the performance data may include data associated with a graphics processing unit (GPU), such as utilization data, shared GPU memory, total GPU memory. In some examples, the performance data may include data associated with a network, such as sending speed, receiving speed, and/or other throughput data.

In various examples, the IM computing device(s) 102 may receive interrogation and diagnostics 302(8). In some examples, the interrogation and diagnostics may be received from a monitoring system of an associated computing device of the collaborative computing system. In some examples, the associated computing device may include hardware and/or software for testing for defects that are able to cause performance and/or functional problems. In such examples, the test may include an interrogation for defects and diagnostics (e.g., results). In various examples, the monitoring system may cause data associated with the interrogation and diagnostics 302(8) to be transmitted to the IM computing device(s) 102.

In various examples, the IM computing device(s) 102 may receive one or more real-time events 302(9). The real-time event(s) 302(9) may include events that occur in real-time or near-real time. In some examples the real-time event(s) 302(9) may include login events, security events (e.g., potential data breach, attempted data breach, firewall breach, etc.), query events, application interactions, and/or any other type of event associated with the collaborative computing system. In various examples, one or more of the inputs 302(1)-302(8) may be received as real-time event(s) 302(9). For example, the end user application interactions 302(1) may be received as a real-time event 302(9).

In various examples, the IM computing device(s) 102 may receive logged events 302(10). The logged event(s) 302(10) may include events that are stored by an associated computing device over a period of time (e.g., 24 hours, 1 week, etc.). In various examples, the associated computing device may be configured to store the data in a datastore, such as datastore 212, and provide the logged event(s) 302(10) to the IM computing device(s) 102 at a periodic interval (e.g., daily, weekly, etc.). In various examples, one or more of the inputs 302(1)-302(8) may be received as logged event(s) 302(10).

In various examples, the IM computing device(s) 102 may receive system performance degradation data 302(11). In some examples, the system performance degradation data 302(11) may include a negative (e.g., decreasing performance) trend corresponding to an associated computing system (e.g., one or more computing devices of the collaborative computing system). In some examples, the system performance degradation data 302(11) may include a increasing latency of an associated computing system and/or network associated with the collaborative computing system. In some examples, the system performance degradation data 302(11) may include an increased use of memory associated with a particular function and/or application of the collaborative computing system. In some examples, the system performance degradation data 302(11) may include a decreased amount of memory available to an associated computing system.

In various examples, the IM computing device(s) 102 may analyze the one or more inputs 302 to determine the one or more outputs 304. The output(s) 304 may include one or more actions to be performed to remedy a fault or prevent a potential future fault. In some examples, the IM computing device(s) 102 may automatically perform the actions (e.g., output(s) 304). In some examples, the IM computing device(s) 102 may send a notification to another computing device associated with the collaborative computing system. In some examples, the notification may include an instruction to perform the action associated with the output(s) 304. In some examples, the IM computing device(s) 102 may determine the one or more outputs 304 utilizing one or more machine learning models and/or other artificial intelligence techniques. In some examples, the IM computing device(s) 102 may determine the one or more outputs utilizing analytics tools. In some examples, the analytics tools may include those configured to perform predictive analysis.

In various examples, the IM computing device(s) 102 may determine one or more network routing modifications 304(2). In some examples, responsive to determining the network routing modification(s) 304(2), the IM computing device(s) 102 may automatically re-route data associated with a degraded or failed network to another network. In some examples, the IM computing device(s) 102 may send a notification of the degraded or failed network to an associated computing device. In some examples, the notification may include an instruction to reroute the associated data to another network. In such examples, the IM computing device(s) 102 may cause the data to be re-routed. In some examples, the instruction may include the other network to which the data is to be routed.

In some examples, the IM computing device(s) 102 may determine one or more predictive models 304(3). The predictive model(s) 304(3) may be determined based on predictive analysis. In some examples, the predictive model(s) 304(3) may provide a probability of an outcome of an associated system based on the input(s) 302. In various examples, the predictive model(s) 304(3) may be utilized to determine one or more potential future faults.

In some examples, the IM computing device(s) 102 may determine one or more discovery learnings 304(4). In some examples, the discovery learning(s) 304(4) may include computer simulations of interactions between computing devices. In such examples, the discovery learning(s) 304(4) may be provided to a computing device and/or a user of the computing device to determine an effectiveness and/or identify improvements to the system.

In some examples, the IM computing device(s) 102 may determine one or more infrastructure modifications and optimization 304(5). In some examples, the infrastructure modification(s) and optimization 304(5) may include updating and/or upgrading software and/or hardware associated with a computing device, increasing memory available, moving data from a first database to a second database, deleting unused data, or the like.

In some examples, the IM computing device(s) 102 may determine one or more alert actions. In some examples, the alert action(s) 304(6) may include actions to be performed based on a received alert 302(6). In some examples, a particular alert action 304(6) may be associated with a particular alert 302(6), such as stored in association with one another in a datastore (e.g., datastore 212). In such examples, responsive to receiving the alert 302(6), the IM computing device 102 may automatically perform the alert action 304(6).

In some examples, the IM computing device(s) 102 may determine one or more preventative health assessments 304(7). In some examples, the preventative health assessments 304(7) may be determined based on one or more detected potential future faults. As discussed above, the IM computing device(s) 102 may determine a potential future fault associated with a particular system (e.g., computing device, network, etc.) of the collaborative computing system. Based in part on the potential future fault, the IM computing device(s) 102 may identify one or more preventative health assessments 304(7) to prevent the potential future fault from happening.

In some examples, IM computing device(s) 102 may be configured to perform the preventative health assessment(s) 304(7) based on a type of computing device or network associated with the collaborative computing system, a known weakness or issue with the computing device or network, a scheduled or unscheduled upgrade to the computing device or network, or the like. In some examples, the IM computing device(s) 102 may perform the preventative health assessment(s) 304(7) periodically (e.g., daily, weekly, monthly, etc.). In some examples, the IM computing device(s) 102 may perform the preventative health assessment(s) 304(7) based on receiving a particular input 302 that indicates a portion of the collaborative computing system may soon experience a fault (e.g., potential future fault exists). In some examples, the IM computing device(s) 102 may provide the results of the preventative health assessment(s) 304(7) to an associated computing device and/or a user associated therewith. In some examples, the IM computing device(S) 102 may provide the results to a manager of the intelligent monitoring and alert system.

In some examples, the IM computing device(s) 102 may determine a resource adaptation and optimization 304(8) for a computing device or network of the collaborative computing system. In various examples, the IM computing device(s) 102 may determine to increase or decrease resources allocated to a workload. For example, if a particular application is operating slowly due to insufficient resources available, the IM computing device(s) 102 may determine to increase resources allocated to the application. In various examples, the IM computing device(s) 102 may optimize the workloads across multiple computing devices associated with the collaborative computing system. In such examples, the IM computing device(s) 102 may increase and/or decrease resources to the multiple computing devices, such as to optimize performance of the collaborative computing system.

In some examples, the IM computing device(s) 102 may be configured to perform capacity planning 304(9) with respect to the collaborative computing system. In some examples, the IM computing device(s) 102 may monitor memory, processing power, application licenses, network bandwidth and/or other resources available to various computing devices of the collaborative computing system. In some examples, the IM computing device(s) 102 may compare available resources against predicted future needs of the collaborative computing system. In various examples, the IM computing device(S) 102 may determine that additional resources may be required by a particular computing device and/or computing system. In such examples, the IM computing device(s) 102 may cause the additional resources to be added to the particular computing device and/or computing system as a part of the capacity planning 304(9). For example, the IM computing device(s) 102 may determine that an agent computing device has insufficient memory to operate efficiently. The IM computing device(s) 102 may send a notification to the agent computing device and/or another computing device associated with an agent office of the agent computing device with an instruction to add memory or upgrade the agent computing device to another device with additional memory.

In some examples, the IM computing device(s) 102 may determine one or more rule definitions 304(10). As discussed above, the IM computing device(s) 102 may determine one or more faults and/or potential future faults based on rules. The rules may be defined by the one or more rule definitions. In some examples, the IM computing device(s) 102 may be configured to identify new and/or modify existing rules based on the inputs 302.

In some examples, the IM computing device(s) 102 may store event data 304(11) in an event data repository, which may be stored in the datastore 212. In such examples, the event data 304(11) may be output to the event data repository. In some examples, the event data 304(11) may include real-time events 302(9) and/or logged events 302(10). In some examples, the event data 304(11) may be stored based on the real-time or non-real-time association with the events.

As discussed, the IM computing device(s) 102 may perform actions based on the output(s) 304. In some examples, the IM computing device(s) 102 may automatically perform the actions described above with respect to outputs 304(1)-304(11). In some examples, the IM computing device(s) 102 may cause another computing device to perform the actions with respect to outputs 304(1)-304(11).

FIGS. 4-8 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

Figure 4:
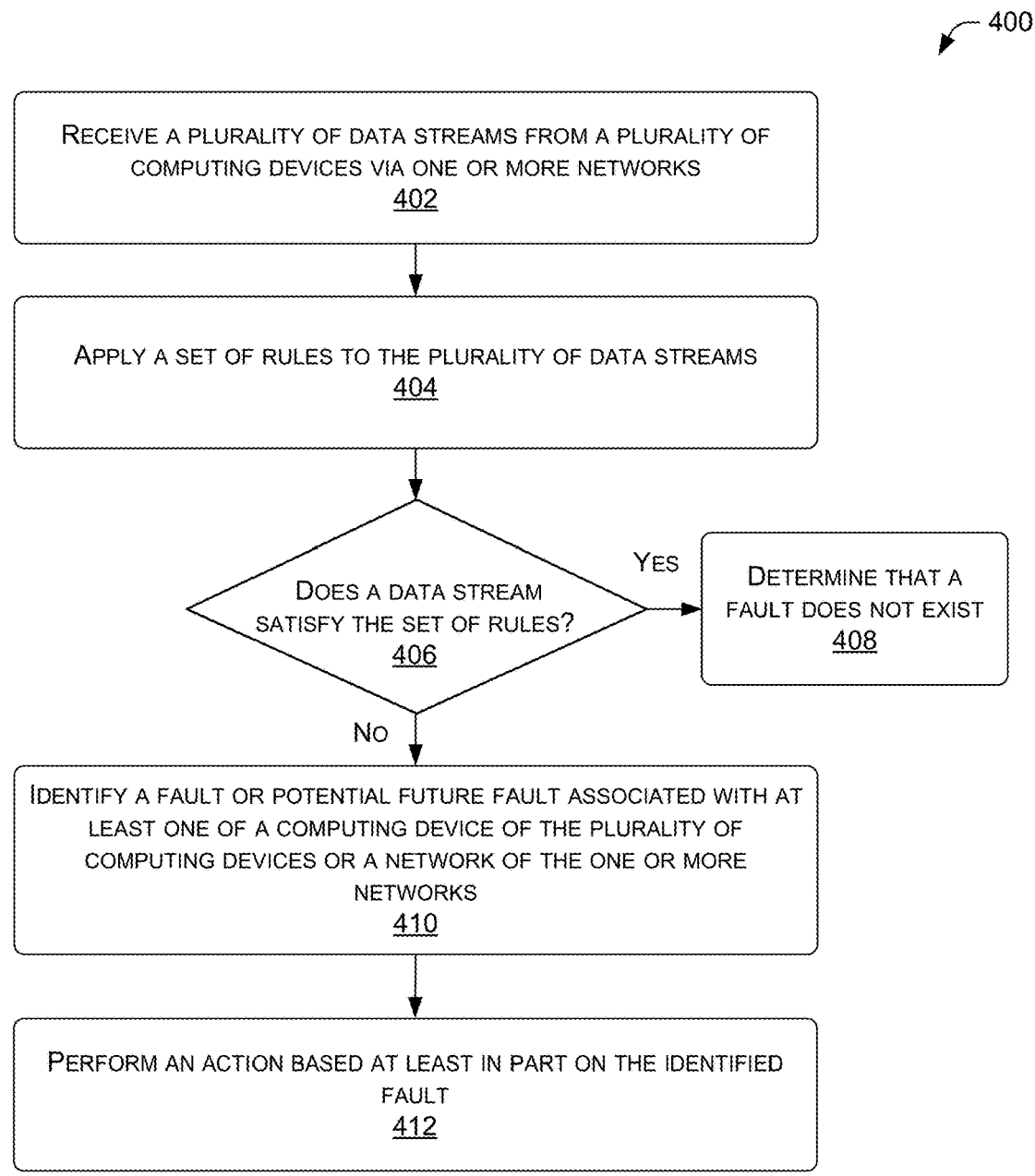
FIG. 4 is a flow diagram illustrating an example process for identifying a fault and/or potential future fault associated with a computing device of a collaborative computing system and performing an action based on the identified fault.

FIG. 4 is an example process 400 for identifying a fault associated with a computing device of a collaborative computing system and performing an action based on the identified fault. In various examples, the process 400 is described with reference to the system 100 and may be performed by the IM computing device(s) 102 and/or in cooperation with any one or more of the enterprise computing devices 106, the agent computing devices 108, and/or the third-party computing devices 110. Of course, the process 400 may be performed in other similar and/or different environments.

At operation 402, the process 400 includes receiving a plurality of data streams from a plurality of computing devices via one or more networks. The plurality of data streams may include the data 104 as discussed above with regard to FIG. 1, or the data 302 discussed above with reference to FIG. 3. In some examples, the plurality of data streams may include streams of real-time and/or near real-time data. In some examples, the data streams may include packets of data, such as those sent periodically and/or intermittently.

In some examples, the plurality of computing devices may include one or more computing devices associated with another organization, such as third-party computing device(s) 110 associated with a third-party resource. In some examples, the third-party resource may include a third-party service provider, such as that configured to provide software as a service, a platform as a service, an infrastructure as a service, an application, or the like. In some examples, the plurality of computing devices may include one or more computing devices associated with an organization or enterprise of the IM computing device (e.g., server computing device), such as enterprise computing device(s) 106 and/or agent devices 108.

The plurality of computing devices may be associated with two or more disparate organizations and may be geographically separated from one another. As such, the plurality of data streams may be transmitted to the IM computing device(s) via one or more networks. The network(s) may include public and/or private networks. In some examples, at least one data stream of the plurality of data streams may include network data associated with at least one network. In such examples, the at least one data stream may include latency information, reported incidents, real-time events, logged events, workload utilization, system performance degradation, and/or other data associated with the at least one network.

In some examples, one or more data streams of the plurality of data streams may be transmitted via a firewall, such as firewall 112. The firewall may include hardware and/or software configured to filter data transmitted to and from an associated computing device. In some examples, the IM computing device(s) may receive a stream of data from the associated computing device corresponding to the firewall, such as real-time events, logged events, alerts, latency and response time, reported incidents, errors associated with the firewall, firewall system performance degradation, or the like.

At operation 404, the process 400 includes applying a set of rules to each data stream of the plurality of data streams. In some examples, the set of rules may correspond to one or more characteristics associated with each data stream of the plurality of data streams and/or an associated computing system. In such examples, the IM computing device(s) may determine the characteristic(s), such as memory available, application behavior, application response, reported incidents, latency, response time, alerts, logged and/or real-time events, workload utilization, and the like. In some examples, the rules may be based on a binary system, such as whether an error or incident occurs with respect to an associated computing device. In various examples, the set of rules may include one or more threshold values associated with the one or more characteristics. The threshold values may define minimum and/or maximum values for an associated device, system, application, network, or the like.

In various examples, the set of rules may include one or more threshold values associated with the one or more characteristics. For example, a rule of the set of rules may include a maximum network latency threshold, defining a minimum speed at which a network can transmit data to satisfy the collaborative computing system. For another example, a rule of the set of rules may include a minimum memory available threshold associated with a computing device of the collaborative computing system. For yet another example, a rule of the set of rules may include a maximum number of login events that the collaborative computing system can process over a period of time without system degradation.

In various examples, the set of rules may be adjusted over time based on utilization loads associated with different computing devices. In such examples, the IM computing device(s) may determine that one or more computing devices have an increased utilization load and may modify the set of rules with respect to the one or more computing devices. For example, at a first time, one or more third-party computing devices may provide a first stream of data associated with a first function (e.g., monitoring enterprise computing device security). A first set of rules may be determined based on the first function and required load associated therewith. At a second, the one or more third-party computing devices may provide the first stream of data and a second stream of data associated with a second function (e.g., monitoring user account security). Based on the additional load of the second function performed by the one or more computing devices, the IM computing device may modify the set of rules with respect to the one or more computing devices.

At operation 406, the process 400 includes determining whether a data stream satisfies the set of rules. In some examples, the IM computing device(s) determine that the data stream does not satisfy the rules based on a determination that an error or incident with respect to the associated systems has occurred. In such an example, the associated systems may include the sending computing device, a firewall though which the data stream is filtered, and/or a network via which the data stream is transmitted. In some examples, the IM computing device(s) determine that the data stream satisfies the rules based on a determination that the characteristic associated with the data stream do not exceed one or more thresholds. In such examples, the IM computing device(s) determine that the characteristics of the data stream are within the minimum and/or maximum performance boundaries.

Based on a determination that the data stream satisfies the rules ("Yes" at operation 406), the process 400 includes, at operation 408, determining that a fault does not exist with respect to the data stream. In some examples, the determination that the fault does not exist may include a determination that no hardware failures, software failures, software errors, and/or firewall errors have occurred. In some examples, the determination that the fault does not exist may include a determination that an associated computing device includes sufficient memory, power and/or connectivity to effectively participate in the collaborative computing system. In some examples, the determination that the fault does not exist may include a determination that a network via which the data stream is transmitted to the IM computing device is operating at or below a maximum network latency (e.g., network latency threshold).

Based on a determination that the data stream does not satisfy the rules ("No" at operation 406), the process 400 includes, at operation 410 identifying a fault associated with at least one of a computing device of the plurality of computing devices or a network of the plurality of networks, the at least one of the computing device or the network being associated with the data stream. The fault may include hardware failures, software errors, firewall errors, slow processing speed, lack of memory, power loss, lack of connectivity, network slow-downs, and the like. For example, a fault may include an increased network latency associated with a network via which the data stream is transmitted.

In some examples, the fault may include a potential future fault associated with the at least one of the computing device or the network. In such examples, the potential future fault may be determined based on a current state of the at least one of the computing device or the network, a trend associated with a latency, response time, one or more logged and/or real-time events, incidents, and/or errors associated with the at least one of the computing device or the network, and/or system performance degradation.

At operation 412, the process 400 includes performing an action based at least in part on the fault. The action may include a network routing modification, infrastructure modification, infrastructure optimization, resource adaptation and optimization, capacity planning (e.g., memory, adoption rates, etc.), and/or other action designed to remedy the fault associated with the at least one of the computing device or the network. In some examples, the action may include storing data associated with the fault, such as in an event data repository.

In some examples, the action may include sending a notification to the at least one of the computing device or a computing device associated with the network to alert a system manager of the fault. In some examples, the notification may include a push notification, electronic mail, short message system message, or other notification system configured to alert a person of the fault. For example, the IM computing device(s) may determine that an external application (e.g., not associated with an organization of the IM computing device(s)) managed by a third-party computing device has associated therewith an application error. The IM computing device(s) may send a notification alerting a third-party resource of the application error. In some examples, another notification may additionally be sent to one or more other computing devices associated with the collaborative computing system, to alert the other computing systems of the fault associated with the at least one of the computing device or the network.

In some examples, the notification may include an instruction for the associated computing device to perform an action to remedy the fault. In such examples, the IM computing device(s) may cause the at least one of the computing device or a computing device associated with the network to perform the action. For example, the IM computing device may determine that a current amount of memory available in an agent device is equal to or less than a threshold amount that will likely be used over a future period of time. The IM computing device(s) may thus send a notification to the agent device and/or another computing device associated with the agent office, with an instruction to remove data stored on the agent device. In some examples, responsive to receiving the notification with the associated instruction, the agent device and/or the other computing device associated with the agent office may automatically (e.g., without user input) remove unused data and/or allocate additional resources to the agent device. For another example, the IM computing device(s) may determine that a network latency associated with a first network is above a latency threshold, and thus has an associated fault. The IM computing device(s) may send an instruction to a computing device sending data via the first network to send the data via a second network.

In some examples, the IM computing device(s) may automatically perform the action to remedy the fault. In some examples, the IM computing device(s) may be configured to perform the action on computing devices associated with the same organization as the IM computing device(s). In such examples, the IM computing device(s) may be configured to re-allocate resources on computing devices associated with the organization (of which the IM computing device(s) is associated), modify a firewall associated with the organization, re-route data based on network latency, and/or perform other actions to remedy faults. As discussed above, the IM computing device(s), the enterprise computing device(s), and/or the agent device(s) may be associated with a same organization. For example, the IM computing device(s) may determine that a fault is associated with the software on multiple agent devices associated with an agent office. The action may include performing a software upgrade on the multiple agent devices. The IM computing device(s) may automatically upgrade the software on the agent devices responsive to determining the fault and/or the action.

Figure 5:
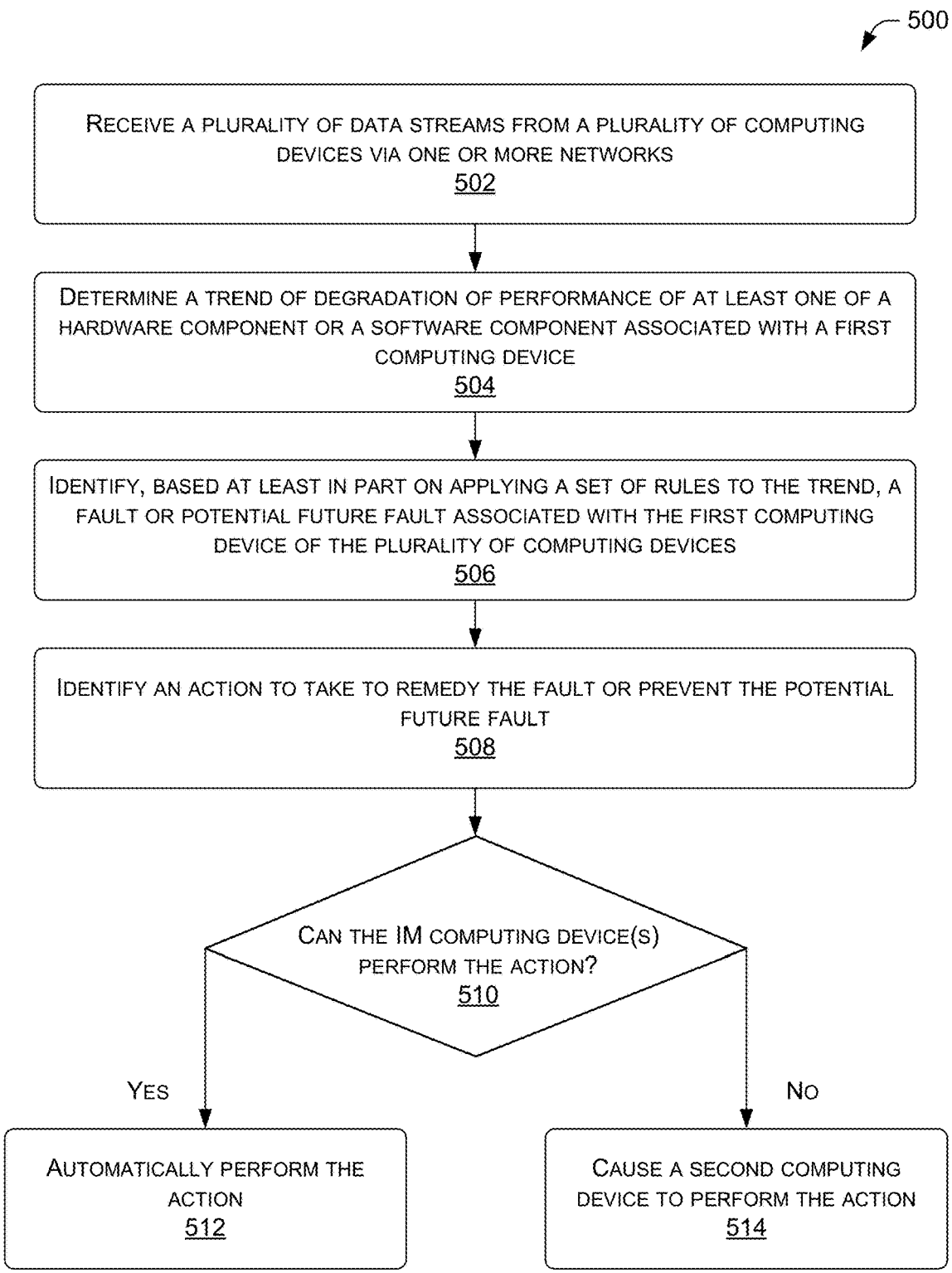
FIG. 5 is a flow diagram illustrating an example process for identifying a fault and/or potential future fault associated with a collaborative computing system and either automatically performing an action to remedy or prevent the fault or causing another computing device to perform the action.

FIG. 5 illustrates an example process 500 for identifying a fault or a potential future fault associated with a collaborative computing system and either automatically performing an action to remedy or prevent the fault or causing another computing device to perform the action. In various examples, the process 500 is described with reference to the system 100 and may be performed by the IM computing device(s) 102 and/or in cooperation with any one or more of the enterprise computing devices 106, the agent computing devices 108, and/or the third-party computing devices 110. Of course, the process 500 may be performed in other similar and/or different environments.

At operation 502, the process 500 includes receiving a plurality of data streams from a plurality of computing devices via one or more networks. The plurality of data streams may include the data 104 as discussed above with regard to FIG. 1, or the data 302 discussed above with reference to FIG. 3. In some examples, the plurality of data streams may include streams of real-time and/or near real-time data. In some examples, the data streams may include packets of data, such as those sent periodically and/or intermittently.

In some examples, the plurality of computing devices may include one or more computing devices associated with another organization, such as third-party computing device(s) 110 associated with a third-party resource. In some examples, the third-party resource may include a third-party service provider, such as that configured to provide software as a service, a platform as a service, an infrastructure as a service, an application, or the like. In some examples, the plurality of computing devices may include one or more computing devices associated with an organization or enterprise of the IM computing device (e.g., server computing device), such as enterprise computing device(s) 106 and/or agent devices 108.

The plurality of computing devices may be associated with two or more disparate organizations and may be geographically separated from one another. As such, the plurality of data streams may be transmitted to the IM computing device(s) via one or more networks. The network(s) may include public and/or private networks. In some examples, at least one data stream of the plurality of data streams may include network data associated with at least one network. In such examples, the at least one data stream may include latency information, reported incidents, real-time events, logged events, workload utilization, system performance degradation, and/or other data associated with the at least one network.

In some examples, one or more data streams of the plurality of data streams may be transmitted via a firewall, such as firewall 112. The firewall may include hardware and/or software configured to filter data transmitted to and from an associated computing device. In some examples, the IM computing device(s) may receive a stream of data from the associated computing device corresponding to the firewall, such as real-time events, logged events, alerts, latency and response time, reported incidents, errors associated with the firewall, firewall system performance degradation, or the like.

At operation 504, the process 500 includes determining a trend of degradation of performance of at least one of a hardware component or a software component of the first computing device. In various examples, the degradation may include the at least one of the hardware component or the software component indicating a fault, incident and/or error, operating at a speed that is equal to or less than a threshold speed, operating at a workload that exceeds a threshold utilization, or the like. For example, the degradation may include a degradation associated with an application managed by and/or running on the first computing device. The trend may be associated with values of one or more characteristics of a data stream increasing or decreasing over time e.g., increasing network latency, decreasing memory availability, increasing response time etc. The trend may also be described by a degree or rate of increase or decrease e.g., slope of the data plotted against time.

At operation 506, the process 500 includes identifying, based at least in part on applying a set of rules to the trend, a fault or potential future fault associated with a first computing device of the plurality of computing devices. In some examples, the set of rules may correspond to one or more characteristics associated with each data stream of the plurality of data streams and/or an associated computing system. In such examples, the IM computing device(s) may determine the characteristic(s), such as memory available, application behavior, application response, reported incidents (e.g., errors), latency, response time, alerts, logged and/or real-time events, workload utilization, and the like. In some examples, the rules may be based on a binary system, such as whether an error or incident occurs with respect to an associated computing device.

In various examples, the set of rules may include one or more threshold values associated with the one or more characteristics. The threshold values may define minimum and/or maximum values for an associated device, system, application, network, or the like. For example, a rule of the set of rules may include a maximum application response time, defining a maximum amount of time that the application may take to respond to a query and/or input. For another example, a rule of the set of rules may include a minimum memory available threshold associated with a computing device of the collaborative computing system. In another example, the set of rules may include a maximum rate of increase e.g., a maximum slope or slope threshold, of the one or more characteristics.

In various examples, the first computing device may include an enterprise computing device, an agent computing device, a third-party computing device, a computing device associated with a firewall located between computing resources, a computing device associated with a network via which data is transmitted, or the like. In some examples, the fault or potential future fault may include hardware failures, software errors, firewall errors, slow processing speed, lack of memory, power loss, lack of connectivity, network slowdowns, and the like. For example, a fault or potential future fault may include an application response time that exceeds a threshold response time. For another example, the fault or potential future fault may include a device error associated with the first computing device.

At operation 508, the process 500 includes identifying an action to take to remedy the degradation. The action may include an infrastructure modification, infrastructure optimization, resource adaptation and optimization, capacity planning (e.g., memory, adoption rates, etc.), and/or other action designed to remedy the fault or prevent the potential future fault associated with the first computing device. In some examples, the action may include storing data associated with the fault, such as in an event data repository.

In some examples, the action may include sending a notification to the first computing device or an associated computing device to alert a system manager of the fault. In some examples, the notification may include a push notification, electronic mail, short message system message, or other notification system configured to alert the system manager of the fault.

At operation 510, the process 500 includes determining whether the IM computing device(s) can perform the action. In some examples, the IM computing device(s) may be configured to perform the action on computing devices associated with a same organization as the IM computing device(s). As discussed above, the IM computing device(s), the enterprise computing device(s), and/or the agent device(s) may be associated with a same organization. In some examples, the action may include sending a notification of the fault to an associated computing device. In such examples, the IM computing device(s) can generate and send the notification.

Based at least in part on a determination that the IM computing device(s) can perform the action ("Yes" at operation 510), the process, at operation 512, includes automatically performing the action by the IM computing device(s). In such examples, the IM computing device(s) may be configured to re-allocate resources on computing devices associated with the organization (of which the IM computing device(s) is associated), modify a firewall associated with the organization, re-route data based on network latency, and/or perform other actions to remedy faults. For example, the IM computing device(s) may determine that a fault is associated with the software on multiple agent devices associated with an agent office. The action may include performing a software upgrade on the multiple agent devices. The IM computing device(s) may automatically upgrade the software on the agent devices responsive to determining the fault and/or the action.

Based at least in part on a determination that the server computing device cannot perform the action ("No" at operation 510), the process, at operation 514, includes causing a second computing device to perform the action. In some examples, the second computing device may include a device that is associated with the first computing device. In some examples, the second computing device and the first computing device may be a same computing device. In various examples, the IM computing device(s) may send an instruction to the second computing device to perform the action associated with the degradation of the first computing device. For example, the IM computing device(s) may send an instruction to the second computing device to allocate additional resources to the first computing device, based on the degradation.

Figure 6:
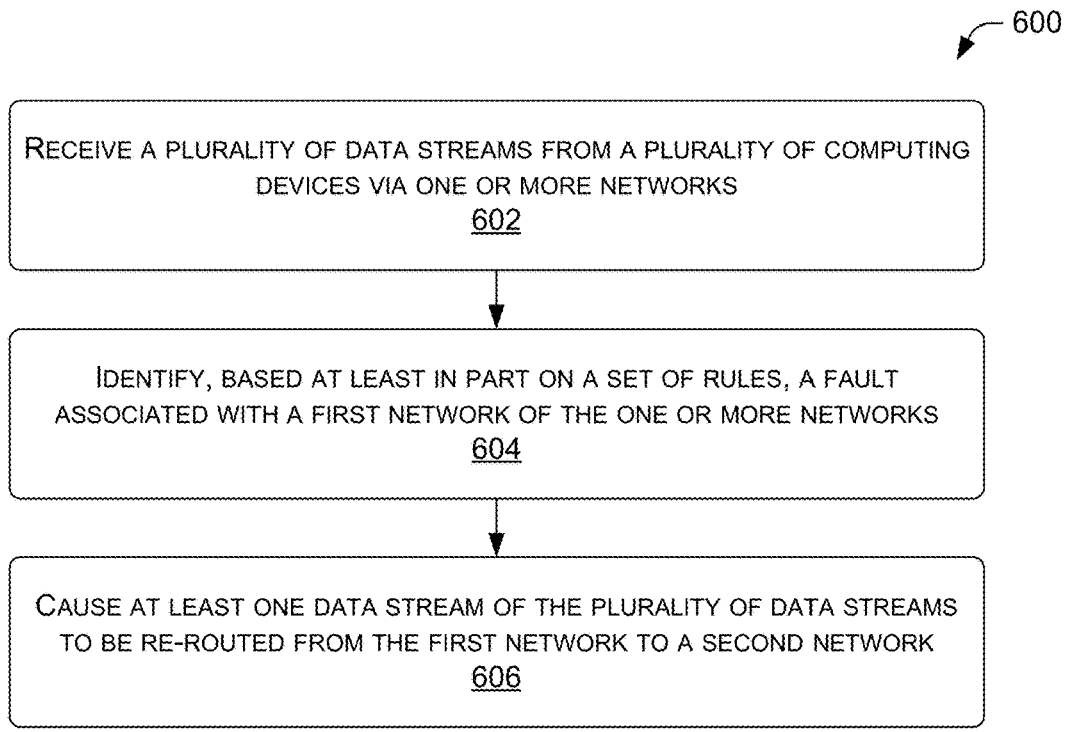
FIG. 6 is a flow diagram illustrating an example process for identifying a fault with a first network and causing data associated with the first network to be routed to a second network.

FIG. 6 illustrates an example process 600 for identifying a fault with a first network and causing data associated with the first network to be routed to a second network. In various examples, the process 600 is described with reference to the system 100 and may be performed by the IM computing device(s) 102 and/or in cooperation with any one or more of the enterprise computing devices 106, the agent computing devices 108, and/or the third-party computing devices 110. Of course, the process 600 may be performed in other similar and/or different environments.

At operation 602, the process 600 includes receiving a plurality of data streams from a plurality of computing devices via one or more networks. The plurality of data streams may include the data 104 as discussed above with regard to FIG. 1. In some examples, the plurality of data streams may include streams of real-time and/or near real-time data. In some examples, the data streams may include packets of data, such as those sent periodically and/or intermittently.

In some examples, the plurality of computing devices may include one or more computing devices associated with another organization, such as third-party computing device(s) 110 associated with a third-party resource. In some examples, the third-party resource may include a third-party service provider, such as that configured to provide software as a service, a platform as a service, an infrastructure as a service, an application, or the like. In some examples, the plurality of computing devices may include one or more computing devices associated with an organization or enterprise of the IM computing device (e.g., server computing device), such as enterprise computing device(s) 106 and/or agent devices 108.

The plurality of computing devices may be associated with two or more disparate organizations and may be geographically separated from one another. As such, the plurality of data streams may be transmitted to the IM computing device(s) via the one or more networks. The network(s) may include public and/or private networks. In some examples, at least one data stream of the plurality of data streams may include network data associated with at least one network. In such examples, the at least one data stream may include latency information, reported incidents, real-time events, logged events, workload utilization, system performance degradation, and/or other data associated with the at least one network.

At operation 604, the process 600 includes identifying, based at least in part on a set of rules, a fault associated with a first network of the one or more networks. In some examples, the fault may include a hardware and/or software failures and/or errors associated with the first network, power loss associated with the first network, increased network latency, and the like.

In some examples, the set of rules may correspond to one or more characteristics associated with the one or more networks. In such examples, the IM computing device(s) may determine the characteristic(s), such as network latency, logged and/or real-time events, error rates, a type of network, quality of service, security, and the like. In some examples, the rules may be based on a binary system, such as whether an error or incident occurs with respect to the network(s). In some examples, the set of rules may include one or more threshold values associated with the characteristic(s). The threshold values may define minimum and/or maximum values for the network(s). For example, a rule of the set of rules may include a maximum network latency associated with the collaborative computing system.

At operation 606, the process 600 includes causing at least one data stream of the plurality of data streams to be re-routed from the first network to a second network. In various examples, the IM computing device(s) may identify a computing device associated with the at least one data stream (of the plurality of data streams) transmitted via the first network. In such examples, the IM computing device(s) may send an instruction to the computing device to send the at least one data stream via the second network. In various examples, the IM computing device(s) may identify the second network based on one or more characteristics associated therewith. In such examples, the IM computing device(s) may determine, based on the characteristic(s), that the second network is capable of delivering the data within the defined set of rules. For example, the IM computing device(s) may determine that a network latency associated with the second network is below a latency threshold. Based on the determination that the network latency is below the threshold, the IM computing device(s) may identify the second network as a more suitable network for data transmission via the collaborative computing system.

Figure 7:
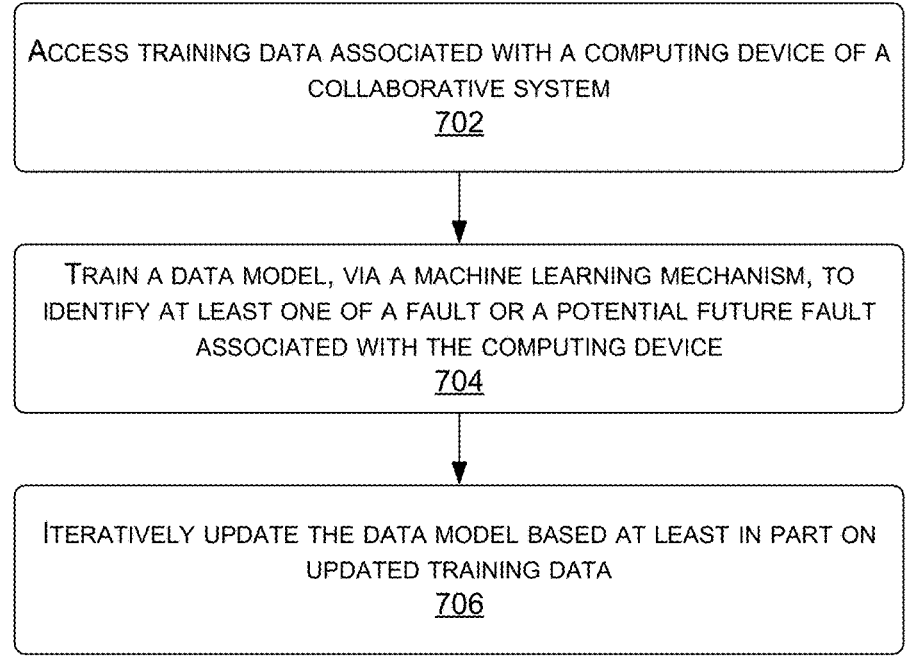
FIG. 7 is a flow diagram illustrating an example process for training a data model to identify a fault or a potential future fault in a computing device associated with a collaborative system.

FIG. 7 illustrates an example process 700 for training a data model to identify a fault or a potential future fault in a computing device associated with a collaborative system. In various examples, the process 700 is described with reference to the system 100 and may be performed by the IM computing device(s) 102 and/or in cooperation with any one or more of the enterprise computing devices 106, the agent computing devices 108, and/or the third-party computing devices 110. Of course, the process 700 may be performed in other similar and/or different environments.

At operation 702, the process 700 includes accessing training data associated with a computing device of a collaborative computing system. As discussed above, a training component of the IM computing device(s) may train one or more data models leveraging machine learning mechanisms. In at least one example, the training component may access training data. The training data may include one or more hardware failures, software errors, firewall errors, processing speeds, memory data, power availability, connectivity data, network latency data, and the like. In some examples, the training data may include one or more actions performed to remedy and/or prevent a fault and/or prevent a potential future fault. Additionally, the training data may include efficacy data, such as a success or a failure of an action to remedy an associated fault or to prevent a potential future fault.

In various examples, the training data may be provided by one or more computing systems associated with the collaborative computing system. For example, one or more third-party computing devices may provide the fault data and/or the action data to the IM computing device(s).

At operation 704, the process 700 includes training a data model, via a machine learning mechanism, to identify at least one of a fault or a potential future fault associated with the computing device. The training component may train the data model based on a plurality of training data items such that, given a new input of failures, errors, latency data, processing speeds, memory data, power availability, or the like, the data model may output a fault or a potential future fault. In some examples, the training component may train the data model based on the plurality of training data items such that given a fault or a potential future fault, the data model may output a recommendation for an action to perform to remedy or prevent the fault or the potential future fault. The recommendation may be determined based on the efficacy data.

In at least one example, the training component may utilize a machine learning mechanism to train the data model. In such an example, the data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In some examples, the training component may utilize one or more statistical models to train the data model.

At operation 706, the process 700 includes iteratively updating the data model based at least in part on updated training data. In at least one example, the training component may receive updated training data. For instance, the training component may receive updated training data after a lapse of a predetermined period of time, at a particular frequency, etc. The updated training data may include updated computing device performance characteristics, faults and/or potential future faults determined, one or more actions taken to remedy and/or prevent the faults, and/or efficacy data associated with the action(s).

Figure 8:
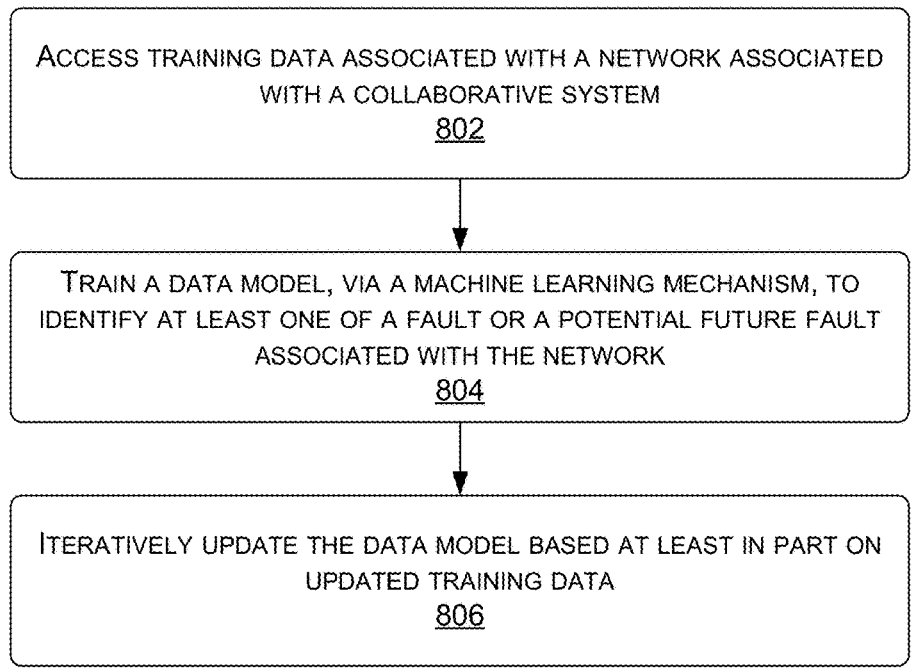
FIG. 8 is a flow diagram illustrating an example process for training a data model to identify a fault or a potential future fault associated with a network associated with a collaborative system.

FIG. 8 illustrates an example process 800 for training a data model to identify a fault or a potential future fault associated with a network associated with a collaborative system. In various examples, the process 800 is described with reference to the system 100 and may be performed by the IM computing device(s) 102 and/or in cooperation with any one or more of the enterprise computing devices 106, the agent computing devices 108, and/or the third-party computing devices 110. Of course, the process 800 may be performed in other similar and/or different environments.

At operation 802, the process 800 includes accessing training data associated with a network associated with a collaborative computing system. As discussed above, a training component of the IM computing device(s) may train one or more data models leveraging machine learning mechanisms. In at least one example, the training component may access training data. The training data may include network characteristics, such as latency, incidents, errors, delays, trends over time, etc. and resultant data, such as what characteristics and/or combination of characteristics led to a fault and/or a potential future fault associated with the network. Additionally, the training data may include one or more actions taken by one or more computing devices of the collaborative computing system based on the network characteristics. In some examples, the training data may include efficacy data associated with the action, such as a success or a failure of the action(s).

At operation 804, the process 800 includes training a data model, via a machine learning mechanism, to identify at least one of a fault or a potential future fault associated with the network. The training component may train the data model based on a plurality of training data items such that, given a new input of network characteristics, the data model may output a determination of a fault or a potential future fault. In some examples, the training component may train the data model based on the plurality of training data to output a determination of an action to perform to remedy or prevent the fault or potential future fault with the network.

In at least one example, the training component may utilize a machine learning mechanism to train the data model. In such an example, the data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In some examples, the training component may utilize one or more statistical models to train the data model.

At operation 806, the process 800 includes iteratively updating the data model based at least in part on updated training data. In at least one example, the training component may receive updated training data. For instance, the training component may receive updated training data after a lapse of a predetermined period of time, at a particular frequency, etc. The updated training data may include updated network characteristics, faults and/or potential future faults determined, one or more actions taken to remedy and/or prevent the faults, and/or efficacy data associated with the action(s).

Implementations of the techniques and systems described herein can improve existing technologies (e.g., error monitoring technologies), and can improve the functioning of the systems with respect to conventional systems. In particular, the implementations described herein provide a consolidated error monitoring and alert system configured to monitor the health of a plurality of computing resources, both local (e.g., company-owned assets) and third-party resources.

Unlike conventional systems, the intelligent error monitoring and alert system described herein may monitor data received from a plurality of disparate computing devices to identify faults in the collaborative system. The faults may be associated with one of the plurality of local computing devices, third-party computing devices, a firewall located between computing resources, a network via which data is transmitted, or the like. The detection of faults associated with disparate, unrelated computing systems, as described herein enhance the functioning of the collaborative system and/or individual computing systems associated therewith. The intelligent error monitoring and alert system described herein includes a single source for error management that may identify and remedy faults faster than conventional systems. The speed and efficiency of error detection and remedy may improve the functioning of individual computing devices associated with the collaborative system and the functioning of the collaborative system as a whole, such as by ensuring that each device of the collaborative computing systems operates at full capacity (e.g., does not experience errors, failures, etc.).

Additionally, the intelligent error monitoring and alert system described herein may be configured to identify potential future faults associated with the corresponding systems (e.g., computing systems, networks, etc.) and with third-party resource computing devices. The detection of potential future faults may enable the intelligent error monitoring and alert system to remedy a deficiency in the system before a fault occurs, thereby preventing faults or failures in the collaborative system. Thus, the techniques described herein may further improve the functioning of individual computing devices associated with the collaborative system and the functioning of the collaborative system as a whole by minimizing or eliminating collaborative system outages and/or failures with associated computing systems.

As a further example, variations of apparatus or process limitations (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

It should be appreciated that the subject matter presented herein can be implemented as a computer process, a computer-controlled apparatus, a computing system, or an article of manufacture, such as a computer-readable storage medium. While the subject matter described herein is presented in the general context of program components that execute on one or more computing devices, those skilled in the art will recognize that other implementations can be performed in combination with other types of program components. Generally, program components include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program components can be located in both local and remote memory storage devices.

What is claimed is:

1. A system associated with a first organization, comprising:
 a processor; and
 computer-readable media storing instructions which, when executed by the processor, causes the processor to:
  receive a first data stream via a first network;
  determine, based on the first data stream, a first value of a characteristic associated with the first network;
  access historical data associated with the first network, wherein the historical data includes historical values of the characteristic over a first period of time;
  predict, based on the first value and the historical values, a future fault associated with the first network;
  receive a second data stream via a second network;
  determine, based the second data stream, a second value of the characteristic associated with the second network;
  identify, based on the second value being less than the first value, an action to perform to prevent occurrence of the future fault, the action including routing the first data stream over the second network;
  determine that a computing device sending the first data stream via the first network is associated with the first organization; and
  based on determining that the computing device is associated with the first organization, routing the first data stream over the second network.

2. The system of claim 1, wherein the characteristic comprises one or more of:
 a latency,
 a response time,
 a network bandwidth,
 a resource utilization,
 a network-related event,
 an alert, or
 a performance degradation.

3. The system of claim 1, wherein the characteristic is a latency, and the action is identified based on the second value being less than the first value.

4. The system of claim 3, wherein the instructions, when executed, further cause the processor to:
 determine that a third data stream is transmitted via the first network;
 determine that the first value is above a latency threshold;
 determine that the second value is below the latency threshold; and
 cause the third data stream to be transmitted via the second network.

5. The system of claim 1, wherein the action further includes one or more of:
 allocating additional resources to the first network,
 generating an alert indicating the predicted future fault, or
 modifying an application associated with the first network.

6. The system of claim 1, wherein the instructions, when executed, further cause the processor to:
 identify a trend associated with the first network based on the first value of the characteristic and the historical data; and
 predict, based on the trend, that a future value of the characteristic will be greater than or equal to a threshold value after a second period of time,
 wherein the future fault is predicted based on predicting that the future value will be greater than or equal to the threshold value.

7. The system of claim 1, wherein, the instructions, when executed, further cause the processor to:
 apply a set of rules to the second data stream, the set of rules including one or more threshold values associated with one or more characteristics associated with the second network;
 determine that the one or more characteristics satisfy the one or more threshold values; and
 identify, based on determining that the one or more characteristics satisfy the one or more threshold values, that the second network is free from faults.

8. The system of claim 1, wherein at least one of the predicted future fault or the action is determined using a machine learning model trained on the historical data.

9. The system of claim 1, wherein causing the action to be performed comprises:
 transmitting, to a computing device sending the first data stream via the first network, a rerouting instruction,
 wherein the rerouting instruction identifies the second network.

10. The system of claim 1, wherein the first data stream is transmitted through a firewall of the system, the instructions further causing the processor to:
 determine, based on the first value and the second value, an error associated with the firewall.

11. A method, comprising:
 receiving a first data stream via a first network;
 determining, based on the first data stream, a first value of a latency associated with the first network;
 accessing historical data associated with the first network, wherein the historical data includes historical values of latency over a first period of time;
 predicting, based on the first value and the historical values, a future fault associated with the first network;
 receiving a second data stream via a second network;
 determining, based on the second data stream, a second value of latency associated with the second network;

identifying, based on the second value being less than the first value, an action to perform to prevent occurrence of the future fault, the action including routing the first data stream over the second network; and causing the action to be performed.

12. The method of claim 11, further comprising:

identifying a trend associated with the first network based on the first value of the latency and the historical data; and predicting, based at least in part on the trend, that a future value of the latency will be greater than or equal to a threshold value after a second period of time, wherein the future fault is determined based on predicting that the future value will be greater than or equal to the threshold value.

13. The method of claim 11, further comprising:

determining that the first value is above a latency threshold; and determining that the second value is below the latency threshold, wherein the action is identified based on the first value being above the latency threshold and the second value being below the latency threshold.

14. The method of claim 11, wherein at least one of the predicted future fault or the action is determined using a machine learning model trained on the historical data.

15. A non-transitory computer-readable medium storing instructions which, when executed by a processor causes the processor to:

receive a first data stream via a first network;

determine, based on the first data stream, a first value of a latency associated with the first network;

access historical data associated with the first network, wherein the historical data includes historical values of latency over a first period of time;

predict, based on the first value and the historical values, a future fault associated with the first network;

receive a second data stream via a second network;

determine, based on the second data stream, a second value of the latency associated with the second network;

identify, based on the second value being less than the first value, an action to perform to prevent occurrence of the future fault, the action including routing the first data stream over the second network; and cause the action to be performed.

16. The non-transitory computer-readable medium of claim 15, wherein the action further includes one or more of:

rerouting the first data stream from the first network to a third network, generating an alert indicating the future fault, or modifying an application associated with the first network.

17. The non-transitory computer-readable medium of claim 15, wherein the instructions further cause the processor to:

identify a trend associated with the first network based at least in part on the historical data; and determine that a trend value associated with the trend meets or exceeds a trend threshold, wherein the future fault is identified based at least in part on the trend value meeting or exceeding the trend threshold.

18. A system, comprising:

a processor; and computer-readable media storing instructions which, when executed by the processor, causes the processor to:

receive a first data stream via a first network, the first data stream transmitted through a firewall of the system;

determine, based on the first data stream, a first value of a characteristic associated with the first network;

access historical data associated with the first network, wherein the historical data includes historical values of the characteristic over a first period of time;

predict, based on the first value and the historical values, a future fault associated with the first network;

receive a second data stream via a second network;

determine, based the second data stream, a second value of the characteristic associated with the second network;

identify, based on the first value and the second value, an action to perform to prevent occurrence of the future fault, the action including generating an alert indicating an error associated with the firewall; and cause the action to be performed.

19. The system of claim 18, wherein the instructions, when executed, further cause the processor to:

identify a trend associated with the first network based on the first value of the characteristic and the historical data; and predict, based on the trend, that a future value of the characteristic will be greater than or equal to a threshold value after a second period of time, wherein the future fault is predicted based on predicting that the future value will be greater than or equal to the threshold value.

20. The system of claim 18, wherein the characteristic comprises one of: a latency, a response time, a network bandwidth, a resource utilization, a network-related event, an alert, or a performance degradation.

21. The system of claim 18, wherein at least one of the predicted future fault or the action is determined using a machine learning model trained on the historical data.

22. The system of claim 18, wherein the characteristic is latency, and the instructions, when executed, cause the processor to:

determine that a third data stream is transmitted via the first network;

determine that the first value is above a latency threshold;

determine that the second value is below the latency threshold; and cause the third data stream to be transmitted via the second network.

* * * * *